(12) United States Patent
Mack

(10) Patent No.: US 6,801,915 B1
(45) Date of Patent: Oct. 5, 2004

(54) PAIRED KEYS FOR DATA STRUCTURES

(76) Inventor: Robert Mack, 69 Buckland Dr., Neshanic Station, NJ (US) 08853

( * ) Notice: Subject to any disclaimer, the term of this patent is extended or adjusted under 35 U.S.C. 154(b) by 613 days.

(21) Appl. No.: 09/362,530

(22) Filed: Jul. 28, 1999

(51) Int. Cl.[7] .............................................. G06F 17/30
(52) U.S. Cl. .............................. 707/100; 707/2; 707/3; 707/101; 707/102
(58) Field of Search ............................ 707/7, 10, 100, 707/101, 102, 201, 200

(56) References Cited

U.S. PATENT DOCUMENTS

| | | | | |
|---|---|---|---|---|
| 5,146,590 A | * | 9/1992 | Lorie et al. ..................... | 707/7 |
| 5,499,359 A | * | 3/1996 | Vijaykumar ................. | 707/201 |
| 5,561,793 A | * | 10/1996 | Bennett et al. ............. | 707/201 |
| 5,717,924 A | * | 2/1998 | Kawai ......................... | 707/102 |
| 5,745,896 A | * | 4/1998 | Vijaykumar ................. | 707/100 |
| 5,974,407 A | * | 10/1999 | Sacks ............................ | 707/2 |
| 5,991,776 A | * | 11/1999 | Bennett et al. ............. | 707/100 |
| 6,044,349 A | * | 3/2000 | Tolopka et al. ................ | 705/1 |
| 6,112,209 A | * | 8/2000 | Gusack ........................ | 707/101 |
| 6,128,626 A | * | 10/2000 | Beauchesne ................ | 707/104 |
| 6,151,601 A | * | 11/2000 | Papierniak et al. ........... | 707/10 |
| 6,175,835 B1 | * | 1/2001 | Shadmon .................... | 707/102 |
| 6,208,993 B1 | * | 3/2001 | Shadmon .................... | 707/102 |
| 6,236,988 B1 | * | 5/2001 | Aldred .......................... | 707/3 |

* cited by examiner

Primary Examiner—Jack Choules
Assistant Examiner—Anh Ly
(74) Attorney, Agent, or Firm—Walter J Tencza, Jr.

(57) ABSTRACT

A plurality of data records is provided, each data record having paired keys comprised of a first key and a second key. The first key identifies each data record in a certain manner and the second key identifies each data record in a different manner. The paired keys can be used to for example, by the first key identifying the original business identity which the data record belongs to, while the second key may identify the current business identity which the data record belongs to. In this way pre-merger data, for example, and post merger data can be retained. In one embodiment an apparatus is provided comprising a first table of data records and a second table of data records. The tables of data records may be stored in a computer memory. Each first table data record may correspond to an entity and may be comprised of a first field having a first set of data identifying a first characteristic of the corresponding entity, a second field having a second set of data identifying a second characteristic of the corresponding entity; and a third field having a third set of data identifying a third characteristic of the corresponding entity. Each second table data record may correspond to an entity and each second table data record may be comprised of a fourth field having a fourth set of data identifying a fourth characteristic of the corresponding entity. Each fourth set of data of each data record of the second table of data records may have a corresponding first set of data in a data record of the first table of data records, which is substantially the same, for the same entity.

27 Claims, 40 Drawing Sheets

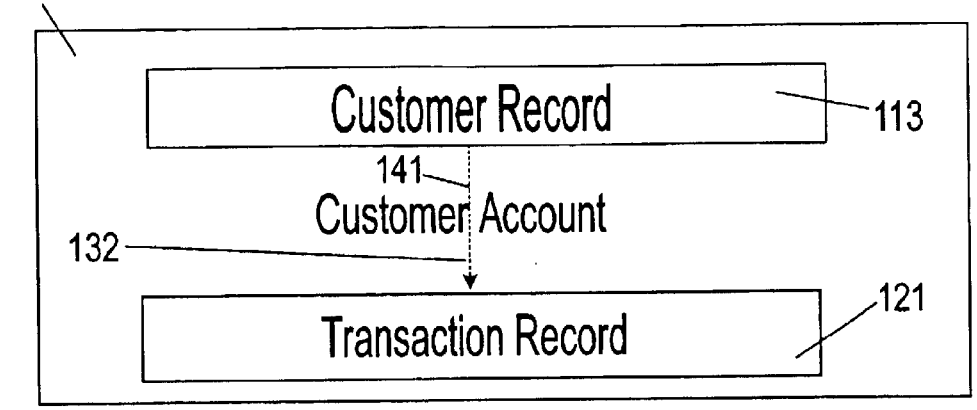
Fig. 1A: Prior Art
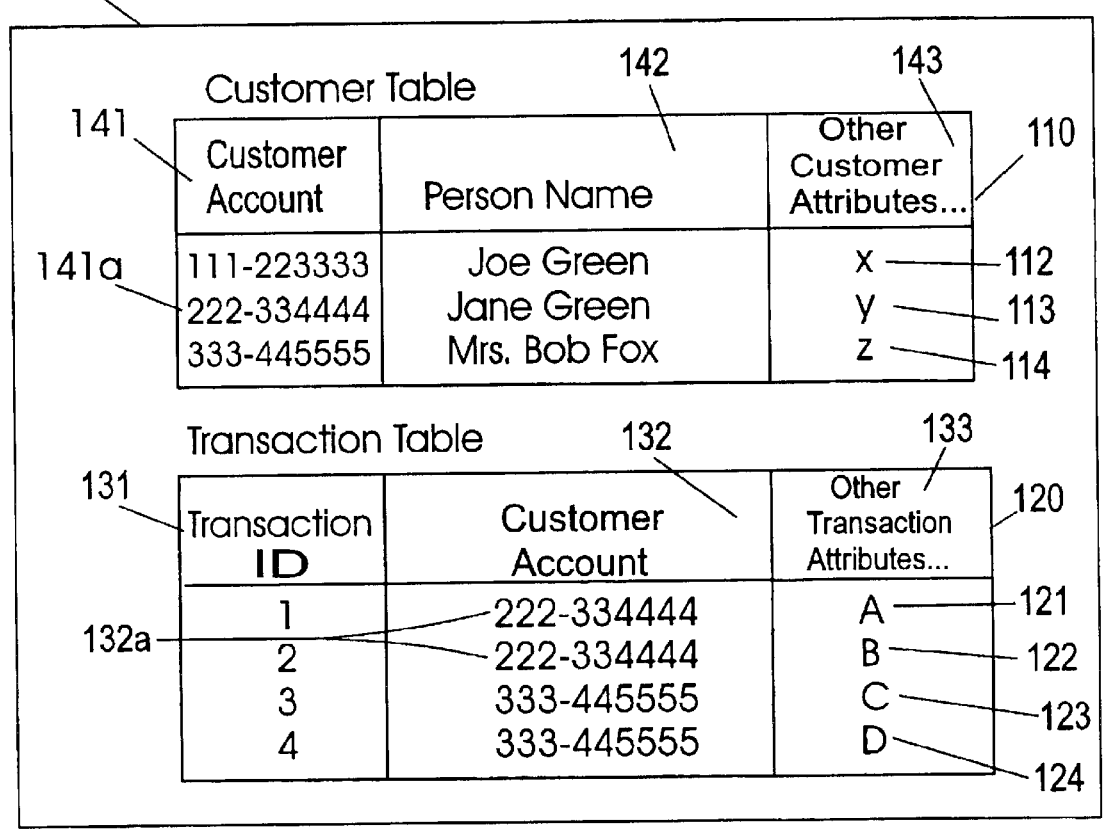
Fig. 1B: Prior Art

Fig. 2A: Prior Art
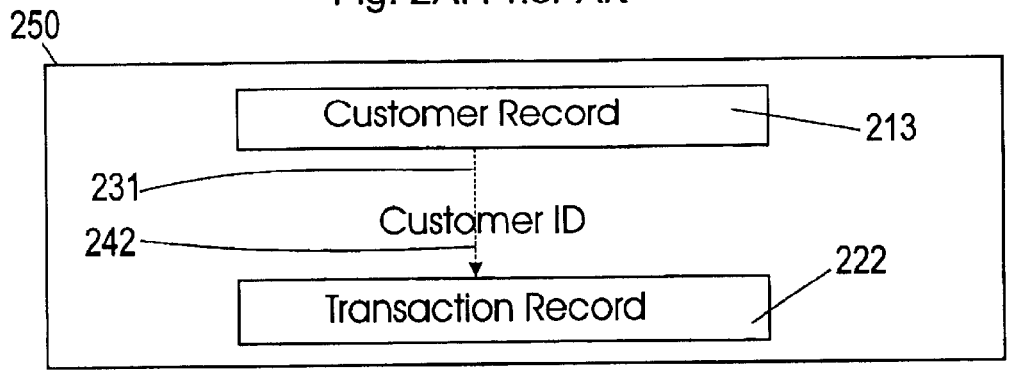
Fig. 2B: Prior Art
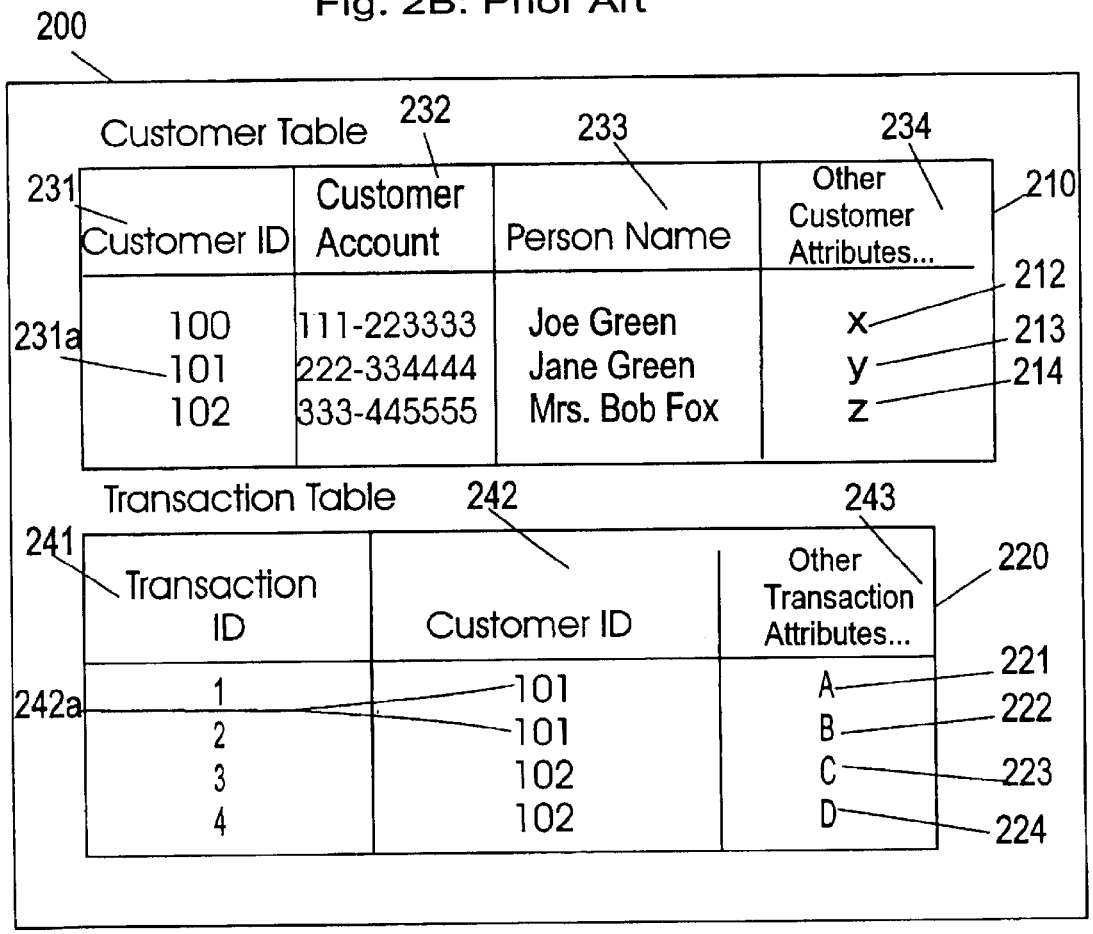

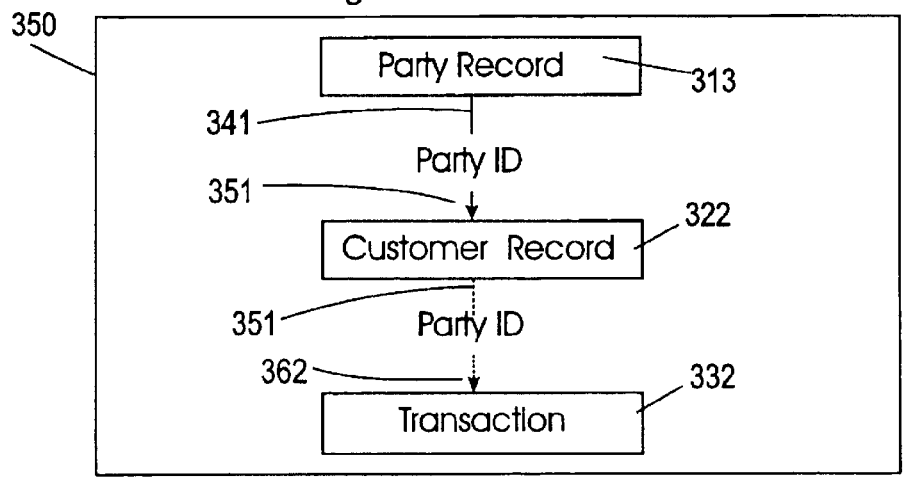
Fig. 3A: Prior Art
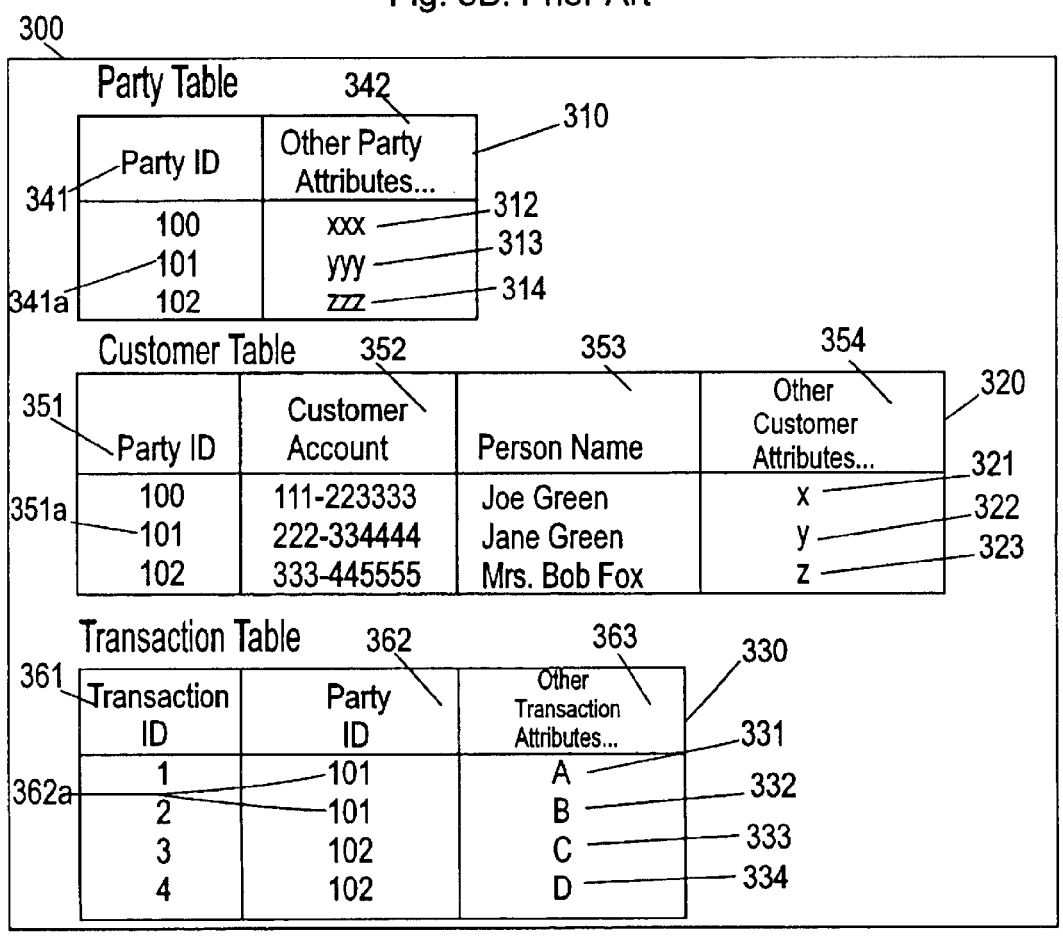
Fig. 3B: Prior Art

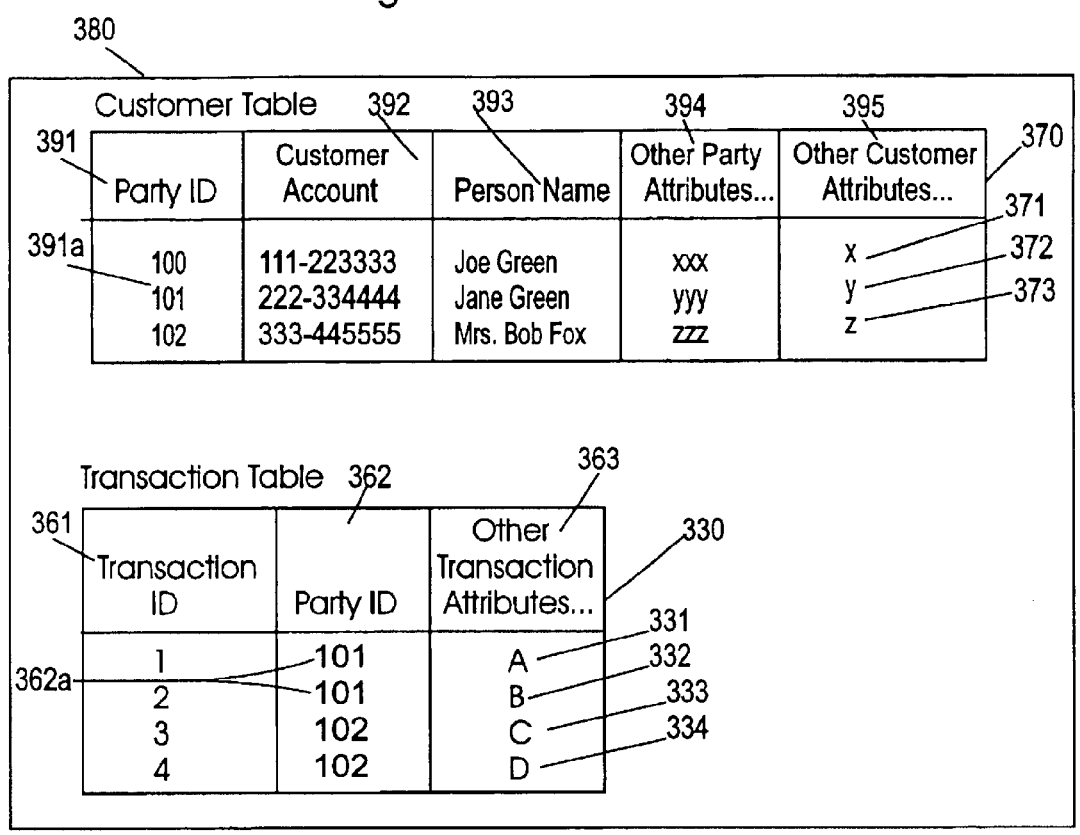
Fig. 3C: Prior Art

Fig. 4B:

Business Party Table

| Business Party ID | Other Business Party Attributes... |
|---|---|
| 50 | aaa |
| 51 | bbb |
| 52 | ccc |

Customer Table

| Customer Account | Business Party ID | Original Business Party | Workflow Status | Person Name | Other Customer Attributes... |
|---|---|---|---|---|---|
| 111-223333 | 50 | 50 | Active | Joe Green | x |
| 222-334444 | 51 | 51 | Active | Jane Green | y |
| 333-445555 | 52 | 52 | Active | Mrs. Bob Fox | z |

Transaction Table

| Transaction ID | Customer Account | Other Transaction Attributes... |
|---|---|---|
| 1 | 222-334444 | A |
| 2 | 222-334444 | B |
| 3 | 333-445555 | C |
| 4 | 333-445555 | D |

Fig. 4C:

Customer Table

| Customer Account | Business Party ID | Original Business Party ID | Workflow Status | Person Name | Other Business Party Attributes... | Other Customer Attributes... |
|---|---|---|---|---|---|---|
| 111-223333 | 50 | 50 | Active | Joe Green | aaa | x |
| 222-334444 | 51 | 51 | Active | Jane Green | bbb | y |
| 333-445555 | 52 | 52 | Active | Mrs. Bob Fox | ccc | z |

Transaction Table

| Transaction ID | Customer Account | Other Transaction Attributes... |
|---|---|---|
| 1 | 222-334444 | A |
| 2 | 222-334444 | B |
| 3 | 333-445555 | C |
| 4 | 333-445555 | D |

Fig.5B:

Business Party Table

| BusinessParty ID | Other Business Party Attributes... |
|---|---|
| 50 | aaa |
| 51 | bbb |
| 52 | ccc |

Customer Table

| Customer ID | Business Party ID | Original Business Party ID | Workflow Status | Person Name | Customer Account | Other Customer Attributes... |
|---|---|---|---|---|---|---|
| 100 | 50 | 50 | Active | Joe Green | 111-223333 | x |
| 101 | 51 | 51 | Duplicate | Jane Green | 222-334444 | y |
| 102 | 52 | 52 | Active | Mrs. Bob Fox | 333-445555 | z |

Transaction Table

| Transaction ID | Customer ID | Other Transaction Attributes... |
|---|---|---|
| 1 | 102 | A |
| 2 | 102 | B |
| 3 | 103 | C |
| 4 | 103 | D |

Fig.5C:

Customer Table

| Customer ID | Business Party ID | Original Business Party ID | Workflow Status | Person Name | Customer Account | Other Business Party Attributes... | Other Customer Attributes... |
|---|---|---|---|---|---|---|---|
| 100 | 50 | 50 | Active | Joe Green | 111-223333 | aaa | x |
| 101 | 52 | 51 | Duplicate | Jane Green | 222-334444 | bbb | y |
| 102 | 52 | 52 | Active | Mrs. Bob Fox | 333-445555 | ccc | z |

Transaction Table

| Transaction ID | Customer ID | Other Transaction Attributes... |
|---|---|---|
| 1 | 100 | A |
| 2 | 101 | B |
| 3 | 101 | C |
| 4 | 102 | D |

Fig.6C:

| Customer Table | | | | | | | | |
|---|---|---|---|---|---|---|---|---|
| Party ID | Business Party ID | Original Business Party ID | Workflow Status | Customer Account | Person Name | Other Party Attributes | Other Customer Attributes | Other Business Party Attributes ... |
| 100 | 50 | 50 | Active | 111-223333 | Joe Green | xxx | x | aa |
| 101 | 52 | 51 | Duplicate | 222-334444 | Jane Green | yyy | y | ab |
| 102 | 52 | 52 | Active | 333-445555 | Mrs. Bob Fox | zzz | z | ac |

| Transaction Table | | |
|---|---|---|
| Transaction ID | Party ID | Other Transaction Attributes ... |
| 1 | 101 | A |
| 2 | 101 | B |
| 3 | 102 | C |
| 4 | 102 | D |

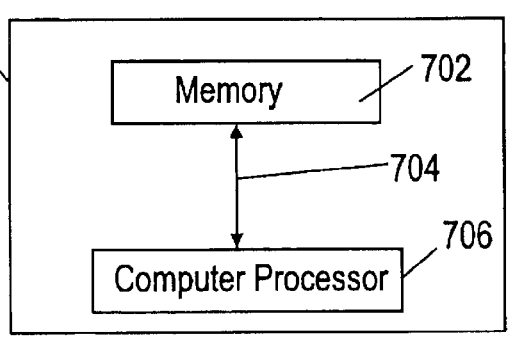

Company Table

| Company ID | Incorporation Date | Name |
|---|---|---|
| 1 | | ABC |
| 2 | | XYZ |
| 3 | 12-Jun-98 | ABCXYZ |

Annual Sales Table

| Company ID | Fiscal Year | Account | Amount ($k) |
|---|---|---|---|
| 1 | 1997 | Net Sales | $1,000.00 |
| 2 | 1997 | Net Sales | $5,000.00 |
| 1 | 1998 | Net Sales | $500.00 |
| 2 | 1998 | Net Sales | $2,000.00 |
| 3 | 1998 | Net Sales | $4,000.00 |

Fig. 8B: Prior Art

Company Table

| Company ID | Incorporation Date | Name |
|---|---|---|
| 1 | | "ABC" |
| 2 | | "XYZ" |
| 3 | 12-Jun-98 | "ABCXYZ" |

Annual Sales Table

| Company ID | Fiscal Year | Account | Amount ($k) |
|---|---|---|---|
| 3 | 1997 | Net Sales | $6,000.00 |
| 3 | 1998 | Net Sales | $6,500.00 |

Fig. 10A: Prior Art

System "A" Person Table

| Person ID | Person Name | Social Security Number |
|---|---|---|
| 344 | Mrs. John Smith | 191-43-1234 |
| 345 | J. Green | 111-22-3333 |
| 346 | Dr. Jack J. Jones | 333-44-5555 |

System "B" Person Table

| ID | Date of Birth | SSN | Name |
|---|---|---|---|
| 112225 | 6/12/78 | 111-22-3333 | Mrs. Jane Green |
| 1111222 | 7/21/80 | 999-99-9999 | M.J. Hall |
| 333334 | 8/30/74 | 333-44-5555 | J.J. Jones |

Fig. 10B: Prior Art

Integrated Person Table

| Person ID | Date of Birth | Social Security Number | Name |
|---|---|---|---|
| 1 | 6/12/78 | 111-22-3333 | Mrs. Jane Green |
| 2 | 7/21/80 | 999-99-9999 | M.J. Hall |
| 3 |  | 191-43-1234 | Mrs. John Smith |
| 4 | 8/30/74 | 333-44-5555 | Dr. Jack J. Jones |

Fig. 11A: Prior Art

System "A" Person Table

| Person ID | Person Name | Social Security Number |
|---|---|---|
| 344 | Mrs. John Smith | 191-43-1234 |
| 345 | J. Green | 111-22-3333 |
| 346 | Dr. Jack J. Jones | 333-44-5555 |

System "B" Person Table

| ID | Date of Birth | SSN | Name |
|---|---|---|---|
| 112225 | 6/12/78 | 111-22-3333 | Mrs. Jane Green |
| 1111222 | 7/21/80 | 999-99-9999 | M.J. Hall |
| 333334 | 8/30/74 | 333-44-5555 | J.J. Jones |

Fig. 11B:

Enterprise Person Table

| Business Party ID | Current Business Party ID | Source System Code | Source System's ID | Date of Birth | Social Security Number | Person Name | Workflow Status |
|---|---|---|---|---|---|---|---|
| 1 | 3 | A | 345 |  | 111-22-3333 | J. Green | Duplicate |
| 2 | 6 | A | 346 |  | 333-44-5555 | Dr. Jack J. Jones | Merge |
| 3 | 3 | B | 112225 | 6/12/78 | 111-22-3333 | Mrs. Jane Green | Active |
| 4 | 4 | B | 1111222 | 7/21/80 | 999-99-9999 | M.J. Hall | Active |
| 5 | 6 | B | 333334 | 8/30/74 | 333-44-5555 | J.J. Jones | Merge |
| 6 | 6 | IS | 6 | 8/30/74 | 333-44-5555 | Dr. Jack J. Jones | Active |
| 7 | 7 | A | 344 |  | 191-43-1234 | Mrs. John Smith | Active |

Fig. 12:

1200 — System "A" Person Table

| Person ID | Enterprise Business Party ID | Person Name | Social Security Number |
|---|---|---|---|
| 344 | 7 | Mrs. John Smith | 191-43-1234 |
| 345 | 1 | J. Green | 111-22-3333 |
| 346 | 2 | Dr. Jack J. Jones | 333-44-5555 |

1200a — System "B" Person Table

| ID | Enterprise Business Party ID | Date of Birth | SSN | Name |
|---|---|---|---|---|
| 112225 | 3 | 6/12/78 | 111-22-3333 | Mrs. Jane Green |
| 1111222 | 4 | 7/21/80 | 999-99-9999 | M.J. Hall |
| 333334 | 5 | 8/30/74 | 333-44-5555 | J.J. Jones |

| DataOrb DDM Reference Data Method | Pre - Execution "Workflow Status" Values | Post - Execution "Workflow Status" Value |
|---|---|---|
| Inactivate Reference Data Method | Active | Inactive |
| Activate Reference Data Method | Inactive | Active |
| Declare Duplicate Reference Data Method | Active | Duplicate |
| Declare Unique Reference Data Method | Duplicate | Active |
| Merge Reference Data Method | Active | Merge |
| Split Reference Data Method | Merge | Active |
| Populate Paired Keys | <no value> | Active |
| Destroy Paired Keys | <any value> | <no value> |

Fig. 14A:

Business Party (1400, 1410)

| Business Party ID (1431) | Business Party Type (1432) | Record Creation Date (1433) |
|---|---|---|
| 100000000 | Person | 5/25/97 (1411) |
| 100000004 | Person | 5/25/97 (1412) |

Person (1420)

| Person ID (1441) | Business Party ID (1442) | Original Business Party ID (1443) | Workflow Status (1444) | Date of Birth (1445) | Person Name (1446) | Marital Status (1447) |
|---|---|---|---|---|---|---|
| 47 | 100000000 | 100000000 | Active | 12/21/55 | Joe Green | Single (1421) |
| 114 | 100000004 | 100000004 | Active | 12/21/55 | Joseph Green | Single (1422) |

Fig. 14B:

Business Party (1400a, 1410a)

| Business Party ID (1431a) | Business Party Type (1432a) | Record Creation Date (1433a) |
|---|---|---|
| 100000000 | Person | 5/25/97 (1411a) |
| 100000004 | Person | 5/25/97 (1412a) |

Person (1420a)

| Person ID (1441a) | Business Party ID (1442a) | Original Business Party ID (1443a) | Workflow status (1444a) | Date of Birth (1445a) | Person Name (1446a) | Marital Status (1447a) |
|---|---|---|---|---|---|---|
| 47 | 100000004 | 100000000 | Duplicate | 12/21/55 | Joe Green | Single (1421a) |
| 114 | 100000004 | 100000004 | Active | 12/21/55 | Joseph Green | Single (1422a) |

Fig. 18:
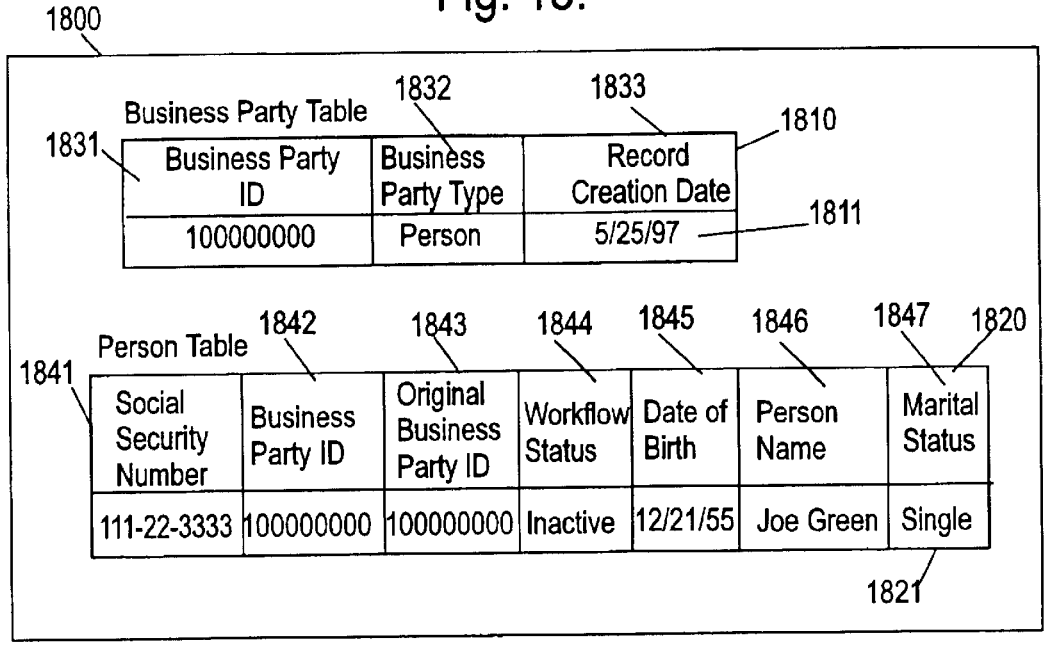
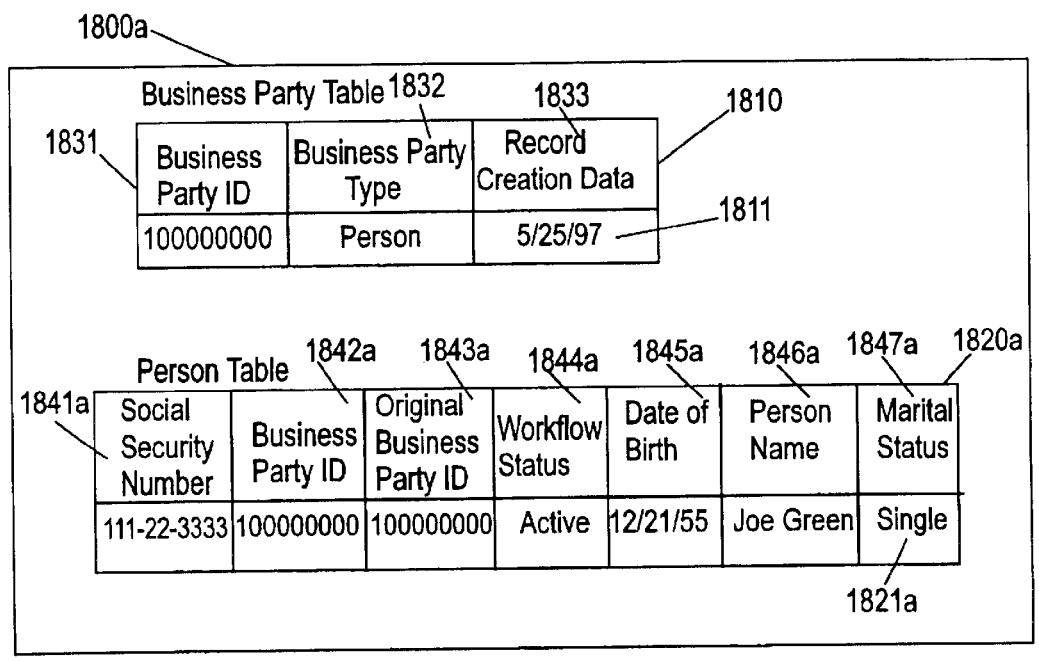

Fig. 20:

Business Party Table (2000, 2031)

| Business Party ID | Business Party Type | Record Creation Date |
|---|---|---|
| 100000000 | Person | 5/25/97 |
| 100000004 | Person | 5/25/97 |

Person Table (2020, 2041)

| Person ID | Business Party ID | Original Business Party ID | Workflow Status | Date of Birth | Person Name | Marital Status |
|---|---|---|---|---|---|---|
| 47 | 100000004 | 10000000 | Duplicate | 12/21/55 | Joe Green | Single |
| 114 | 100000004 | 10000004 | Active | 12/21/55 | Joseph Green | Single |

Business Party Table (2000a, 2031)

| Business Party ID | Business Party Type | Record Creation Data |
|---|---|---|
| 100000000 | Person | 5/25/97 |
| 100000004 | Person | 5/25/97 |

Person (2020a, 2041a)

| Person ID | Business Party ID | Original Business Party ID | Workflow Status | Date of Birth | Person Name | Marital Status |
|---|---|---|---|---|---|---|
| 47 | 100000000 | 100000000 | Active | 12/21/55 | Joe Green | Single |
| 114 | 100000004 | 100000004 | Active | 12/21/55 | Joseph Green | Single |

Fig. 21:

Business Party Table (2100)

| Business Party ID | Business Party Type | Record Creation Date |
|---|---|---|
| 10 | Company | 5/25/91 |
| 20 | Company | 1/14/93 |
| 30 | Company | 2/10/98 |

Company Table

| Company ID | Business Party ID | Original Business Party ID | Workflow Status | Incorporation Date | Company Name |
|---|---|---|---|---|---|
| 1 | 10 | 10 | Active | | AAA |
| 2 | 20 | 20 | Active | | ZZZ |
| 3 | 30 | 30 | Active | 6/12/98 | AAA-ZZZ |

Business Party Table (2100a)

| Business Party ID | Business Party Type | Record Creation Data |
|---|---|---|
| 10 | Company | 5/25/91 |
| 20 | Company | 1/14/93 |
| 30 | Company | 2/10/98 |

Company Table

| Company ID | Business Party ID | Original Business Party ID | Workflow Status | Incorporation Date | Company Name |
|---|---|---|---|---|---|
| 1 | 30 | 10 | Merge | | AAA |
| 2 | 30 | 20 | Merge | | ZZZ |
| 3 | 30 | 30 | Active | 6/12/98 | AAA-ZZZ |

Business Party Table 2231

| Business Party ID | Business Party Type | Record Creation Date |
|---|---|---|
| 10 | Company | 5/25/91 |
| 20 | Company | 1/14/93 |
| 30 | Company | 2/10/98 |

2210, 2211, 2212, 2213

Company Table 2241

| Company ID | Business Party ID | Original Business Party ID | Workflow Status | Incorporation Date | Company Name |
|---|---|---|---|---|---|
| 1 | 30 | 10 | Merge | | AAA |
| 2 | 30 | 20 | Merge | | ZZZ |
| 3 | 30 | 30 | Active | 6/12/98 | AAA-ZZZ |

2220, 2221, 2222, 2223

2200a

Business Party Table 2231

| Business Party ID | Business Party Type | Record Creation Data |
|---|---|---|
| 10 | Company | 5/25/91 |
| 20 | Company | 1/14/93 |
| 30 | Company | 2/10/98 |

2210, 2211, 2212, 2213

Company Table 2241a

| Company ID | Business Party ID | Original Business Party ID | Workflow Status | Incorporation Date | Company Name |
|---|---|---|---|---|---|
| 1 | 10 | 10 | Active | | AAA |
| 2 | 20 | 20 | Active | | ZZZ |
| 3 | 30 | 30 | Active | 6/12/98 | AAA-ZZZ |

2331 Business Party — 2332, 2333, 2334, 2335, 2310

| Business Party ID | Source System Code | Source System's ID | Business Party Type | Record Creation Date |
|---|---|---|---|---|
|  |  |  |  |  |

2341 Person — 2342, 2343, 2344, 2345, 2346, 2320

| Business Party ID | Current Business Party ID | Date of Birth | Social Security Number | Person Name | Workflow Status |
|---|---|---|---|---|---|
|  |  |  |  |  |  |

2300a

2331a Business Party — 2332a, 2333a, 2334a, 2335a, 2310a

| Business Party ID | Source System Code | Source System's ID | Business Party Type | Record Creation Date |  |
|---|---|---|---|---|---|
| 1 | A | 345 | Person | 2/14/98 | 2311a |
| 2 | A | 346 | Person | 2/14/98 | 2312a |
| 3 | B | 112225 | Person | 5/10/98 | 2313a |
| 4 | B | 1111222 | Person | 5/10/98 | 2314a |
| 5 | B | 333334 | Person | 5/18/98 | 2315a |
| 6 | IS | 6 | Person | 5/20/98 | 2316a |
| 7 | A | 344 | Person | 5/20/98 | 2317a |

2341a Person — 2342a, 2343a, 2344a, 2345a, 2320a

| Business Party ID | Current Business Party ID | Date of Birth | Social Security Number | Person Name | Workflow Status |  |
|---|---|---|---|---|---|---|
| 1 | 3 |  | 111-22-3333 | J. Green | Duplicate | 2321a |
| 2 | 6 |  | 333-44-5555 | Dr. Jack J. Jones | Merge | 2322a |
| 3 | 3 | 6/12/78 | 111-22-3333 | Mrs. Jane Green | Active | 2323a |
| 4 | 4 | 7/21/80 | 999-99-9999 | M.J. Hall | Active | 2324a |
| 5 | 6 | 8/30/74 | 333-44-5555 | J.J. Jones | Merge | 2325a |
| 6 | 6 | 8/30/74 | 333-44-5555 | Dr. Jack J. Jones | Active | 2326a |
| 7 | 7 |  | 191-43-1234 | Mrs. John Smith | Active | 2327a |

Fig. 24:

Business Party

| Business Party ID | Source System Code | Source System's ID | Business Party Type | Record Creation Date |
|---|---|---|---|---|
| 1 | A | 345 | Person | 2/14/98 |
| 2 | A | 346 | Person | 2/14/98 |
| 3 | B | 112225 | Person | 5/10/98 |
| 4 | B | 1111222 | Person | 5/10/98 |
| 5 | B | 333334 | Person | 5/18/98 |
| 6 | IS | 6 | Person | 5/20/98 |
| 7 | A | 344 | Person | 5/20/98 |

Person

| Business Party ID | Current Business Party ID | Date of Birth | Social Security Number | Person Name | Workflow Status |
|---|---|---|---|---|---|
| 1 | 3 | | 111-22-3333 | J. Green | Duplicate |
| 2 | 6 | | 333-44-5555 | Dr. Jack J. Jones | Merge |
| 3 | 3 | 6/12/78 | 111-22-3333 | Mrs. Jane Green | Active |
| 4 | 4 | 7/21/80 | 999-99-9999 | M.J. Hall | Active |
| 5 | 6 | 8/30/74 | 333-44-5555 | J.J. Jones | Merge |
| 6 | 6 | 8/30/74 | 333-44-5555 | Dr. Jack J. Jones | Active |
| 7 | 7 | | 191-43-1234 | Mrs. John Smith | Active |

Business Party

| Business Party ID | Source System Code | Source System's ID | Business Party Type | Record Creation Date |
|---|---|---|---|---|
| | | | | |

Person

| Business Party ID | Current Business Party ID | Date of Birth | Social Security Number | Person Name | Workflow Status |
|---|---|---|---|---|---|
| | | | | | |

Fig.28:
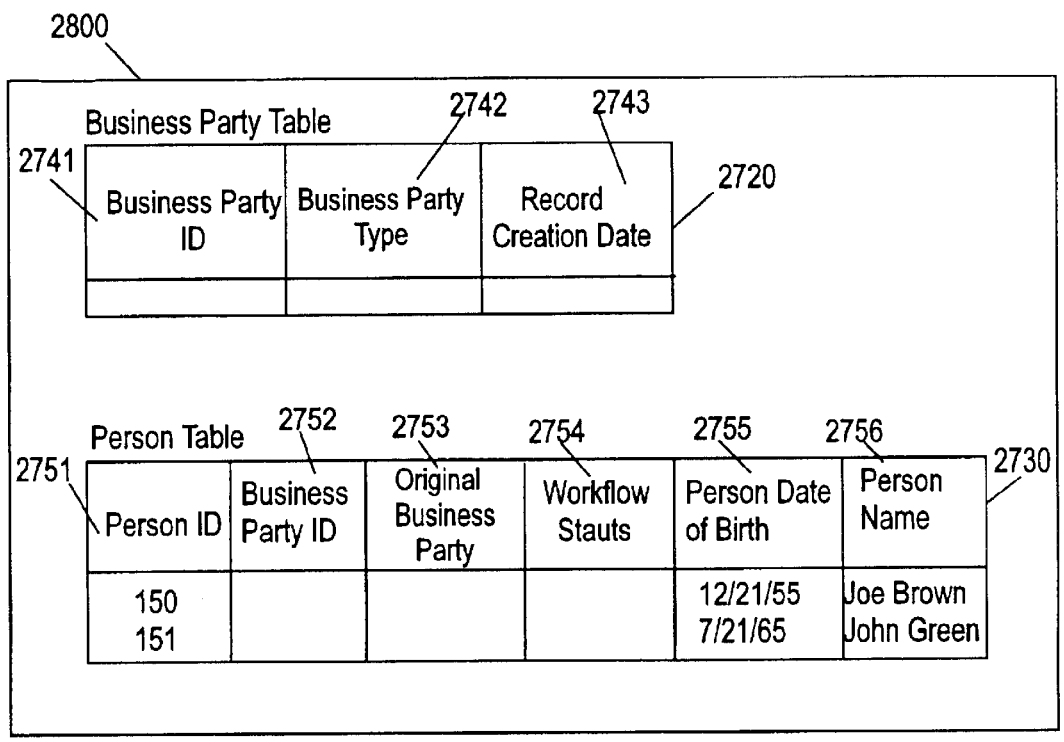
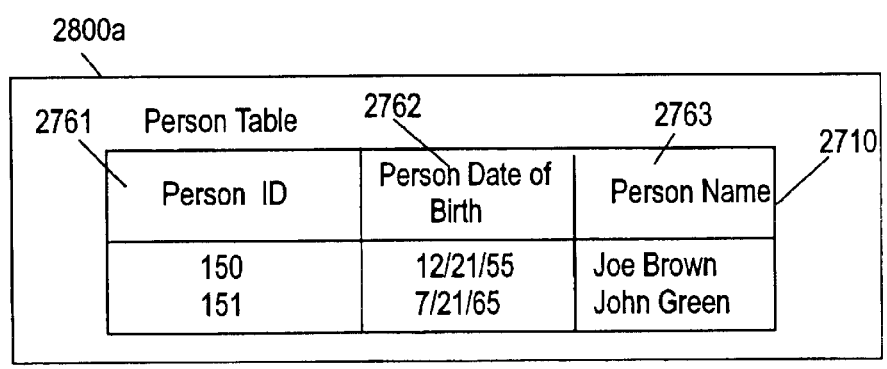

Business Party Table

| Business Party ID | Business Party Type | Record Creation Date |
|---|---|---|
| 1 | Person | 15-May-98 |
| 2 | Person | 15-May-98 |

2910

Person Table

| Person ID (2921) | Business Party ID (2922) | Original Business Party ID (2923) | Workflow Status (2924) | Person Date of Birth (2925) | Person Name (2926) |
|---|---|---|---|---|---|
| 150 | 1 | 1 | Active | 12/21/55 | Joe Brown |
| 151 | 2 | 2 | Active | 7/21/65 | John Green |

2920

2900a

Business Party Table

| Business Party ID | Business Party Type | Record Creation Date |
|---|---|---|
| 1 | Person | 15-May-98 |
| 2 | Person | 15-May-98 |

2910

Person Table

| Original Business Party (2923) | Business Party ID (2922) | Person ID (2921) | Workflow Status (2924) | Person Date of Birth (2925) | Person Name (2926) |
|---|---|---|---|---|---|
| 1 | 1 | 150 | Active | 12/21/55 | Joe Brown |
| 2 | 2 | 151 | Active | 7/21/65 | John Green |

Business Party Table 3000

| Business Party ID | Business Party Type | Record Creation Date |
|---|---|---|
| 1 | Person | 15-May-98 |
| 2 | Person | 15-May-98 |

Person Table

| Original Business Party | Business Party ID | Person ID | Workflow Status | Person Date of Birth | Person Name |
|---|---|---|---|---|---|
| 1 | 1 | 150 | Active | 12/21/55 | Joe Brown |
| 2 | 2 | 151 | Active | 7/21/65 | John Green |

Business Party Table 3000a

| Business Party ID | Business Party Type | Record Creation Date |
|---|---|---|
| 1 | Person | 15-May-98 |
| 2 | Person | 15-May-98 |

Person Table

| Person ID | Business Party ID | Original Business Party ID | Workflow Status | Person Date of Birth | Person Name |
|---|---|---|---|---|---|
| 150 | 1 | 1 | Active | 12/21/55 | Joe Brown |
| 151 | 2 | 2 | Active | 7/21/65 | John Green |

Fig. 31:
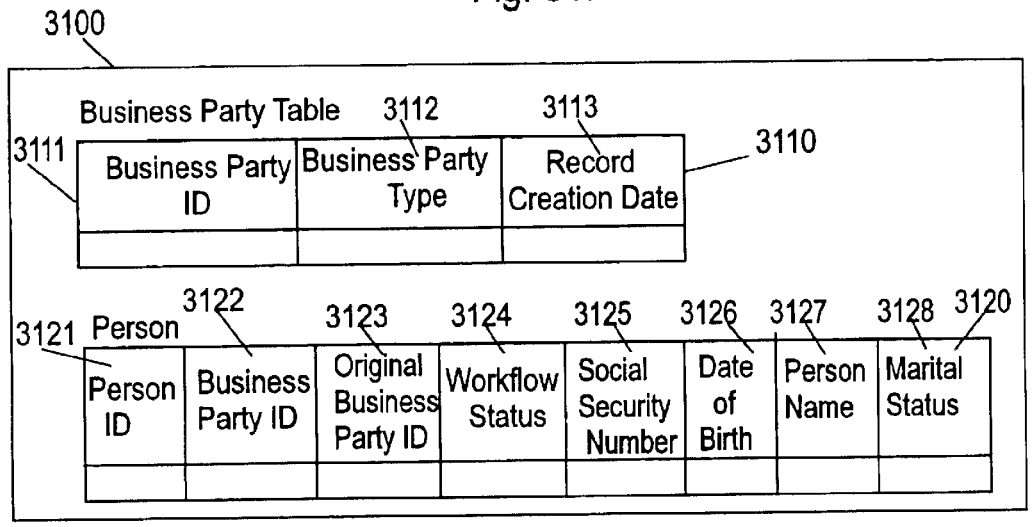
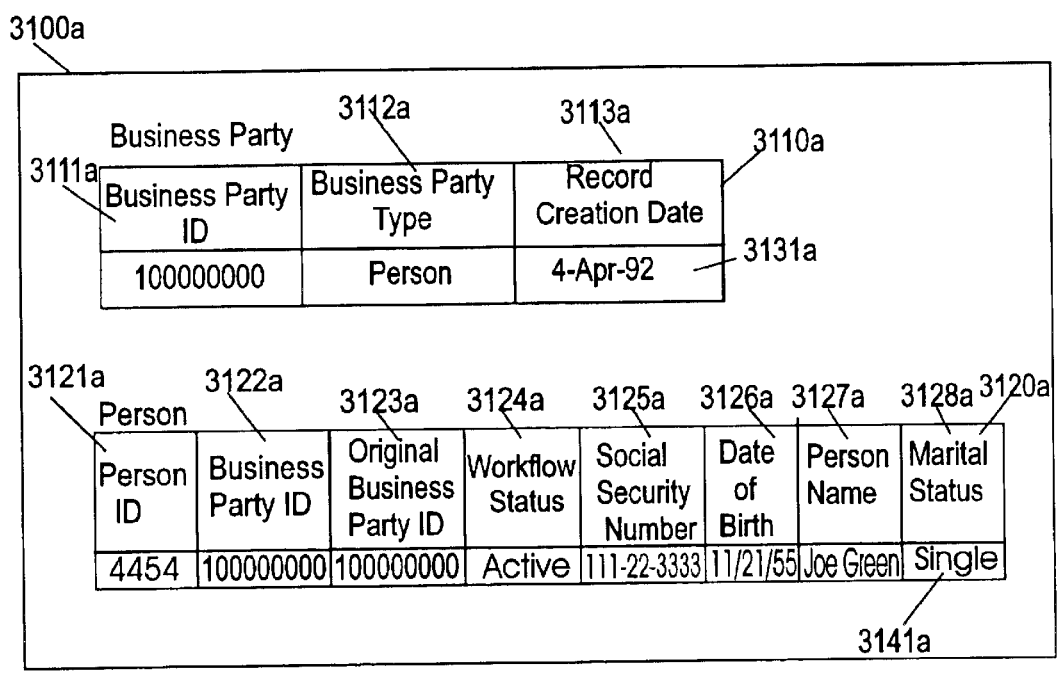

Fig. 32:
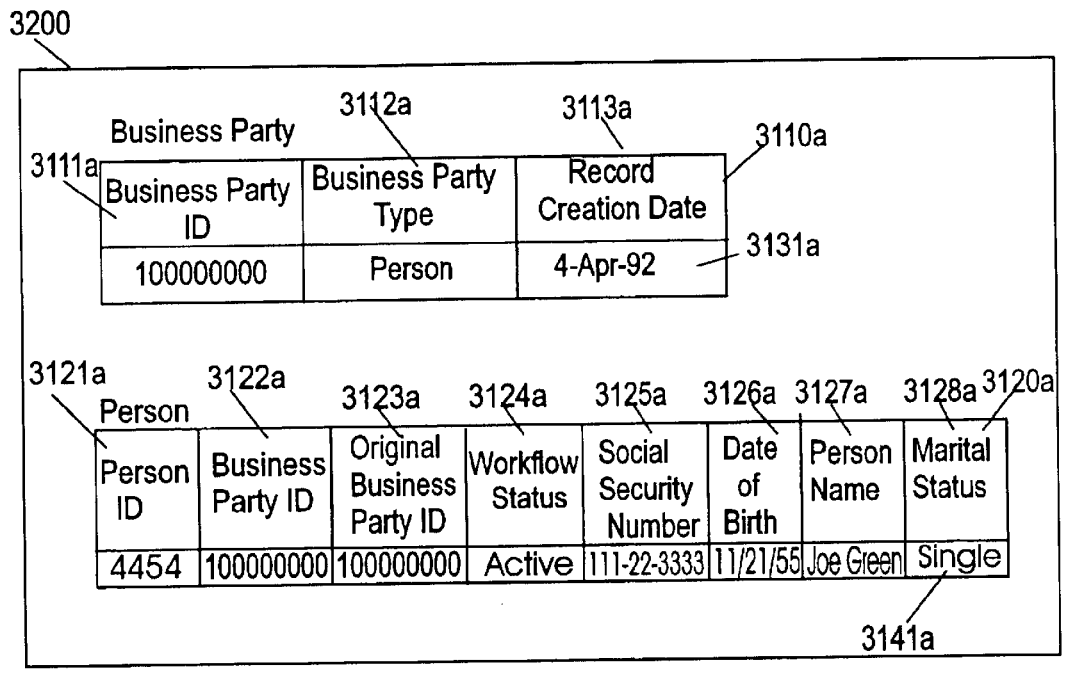
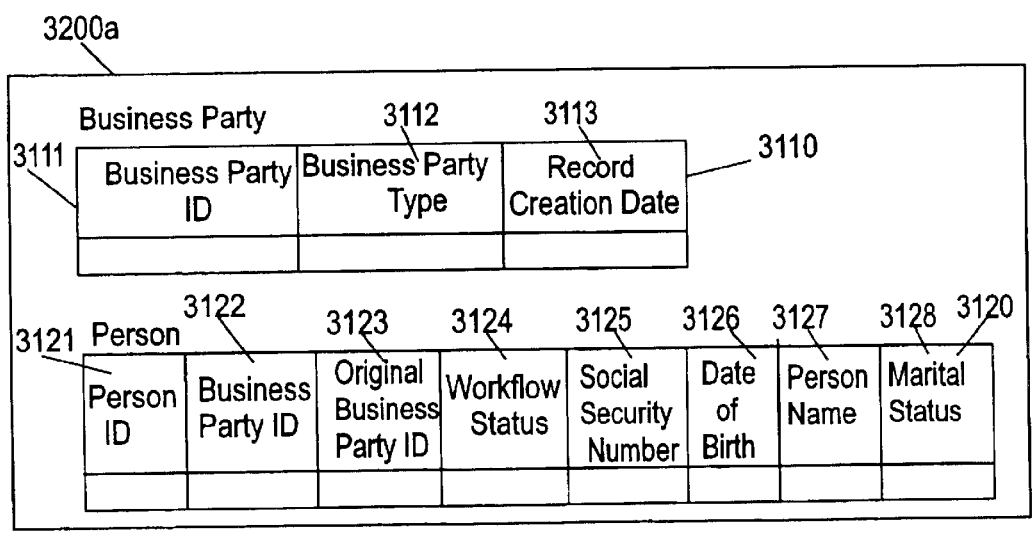

Fig. 33:

Business Party Table (3300, 3310)

| Business Party ID (3311) | Business Party Type (3312) | Record Creation Date (3313) |
|---|---|---|

Person Table (3320)

| Person ID (3321) | Business Party ID (3322) | Original Business Party ID (3323) | Workflow Status (3324) | Person Date Of Birth (3325) | Person Name (3326) |
|---|---|---|---|---|---|
| 150 | | | | 12/21/55 | Joe Brown (3361) |
| 151 | | | | 7/21/65 | John Green (3362) |

Business Organization Table (3330)

| Business Org ID (3331) | Business Party ID (3332) | Original Business Party ID (3333) | Workflow Status (3334) | DUNS Number (3335) | Business Name (3336) |
|---|---|---|---|---|---|
| 150 | | | | 12345-3456-55 | XYZ, Inc. (3371) |

Government Agency Table (3340)

| Govnt Agency ID (3341) | Business Party ID (3342) | Original Business Party ID (3343) | Workflow Status (3344) | Govnt Branch (3345) | Government Agency Name (3346) |
|---|---|---|---|---|---|
| 150 | | | | Executive | White House (3381) |
| 151 | | | | Judicial | Dept. of Justice (3382) |

---

Business Party Table (3300a, 3310a)

| Business Party ID (3311a) | Business Party Type (3312a) | Record Creation Date (3313a) |
|---|---|---|
| 1 | Person | 15-May-98 (3351a) |
| 2 | Person | 15May-98 (3352a) |
| 3 | Busn Org | 15-May-98 (3353a) |
| 4 | Govnt | 15-May-98 (3354a) |
| 5 | Govnt | 15-May-98 (3355a) |

Person Table (3320a)

| Person ID (3321a) | Business Party ID (3322a) | Original Business Party ID (3323a) | Workflow Status (3324a) | Person Date Of Birth (3325a) | Person Name (3326a) |
|---|---|---|---|---|---|
| 150 | 1 | 1 | Active | 12/21/55 | Joe Brown (3361a) |
| 151 | 2 | 2 | Active | 7/21/65 | John Green (3362a) |

Business Organization Table (3330a)

| Business Org ID (3331a) | Business Party ID (3332a) | Original Business Party ID (3333a) | Workflow Status (3334a) | DUNS Number (3335a) | Business Name (3336a) |
|---|---|---|---|---|---|
| 150 | 3 | 3 | Active | 12345-3456-55 | XYZ, Inc. (3371a) |

Government Agency Table (3340a)

| Govnt Agency ID (3341a) | Business Party ID (3342a) | Original Business Party ID (3343a) | Workflow Status (3344a) | Govnt Branch (3345a) | Government Agency Name (3346a) |
|---|---|---|---|---|---|
| 150 | 4 | 4 | Active | Executive | White House (3381a) |
| 151 | 5 | 5 | Active | Judicial | Dept. of Justice (3382a) |

Business Party Table

| Business Party ID | Business Party Type | Record Creation Date |
|---|---|---|
| 1 | Person | 15-May-98 |
| 2 | Person | 15May-98 |
| 3 | Busn Org | 15-May-98 |
| 4 | Govnt | 15-May-98 |
| 5 | Govnt | 15-May-98 |

Person Table

| Person ID | Business Party ID | Original Business Party ID | Workflow Status | Person Date Of Birth | Person Name |
|---|---|---|---|---|---|
| 150 | 1 | 1 | Active | 12/21/55 | Joe Brown |
| 151 | 2 | 2 | Active | 7/21/65 | John Green |

Business Organization Table

| Business Org ID | Business Party ID | Original Business Party ID | Workflow Status | DUNS Number | Business Name |
|---|---|---|---|---|---|
| 150 | 3 | 3 | Active | 12345-3456-55 | XYZ, Inc. |

Government Agency Table

| Govnt Agency ID | Business Party ID | Original Business Party ID | Workflow Status | Govnt Branch | Govenment Agency Name |
|---|---|---|---|---|---|
| 150 | 4 | 4 | Active | Executive | White House |
| 151 | 5 | 5 | Active | Judicial | Dept. of Justice |

3400a

Business Party Table

| Business Party ID | Business Party Type | Record Creation Date |
|---|---|---|
| | | |

Person Table

| Person ID | Business Party ID | Original Business Party ID | Workflow Status | Person Date Of Birth | Person Name |
|---|---|---|---|---|---|
| 150 | | | | 12/21/55 | Joe Brown |
| 151 | | | | 7/21/65 | John Green |

Business Organization Table

| Business Org ID | Business Party ID | Original Business Party ID | Workflow Status | DUNS Number | Business Name |
|---|---|---|---|---|---|
| 150 | | | | 12345-3456-55 | XYZ, Inc. |

Government Agency Table

| Govnt Agency ID | Business Party ID | Original Business Party ID | Workflow Status | Govnt Branch | Govenment Agency Name |
|---|---|---|---|---|---|
| 150 | | | | Executive | White House |
| 151 | | | | Judicial | Dept. of Justice |

PAIRED KEYS FOR DATA STRUCTURES

FIELD OF THE INVENTION

This invention relates to computer databases and minimizing changes needed to databases when updating is required, and keeping database information consistent and preventing redundancies.

BACKGROUND OF THE INVENTION

Primary keys have a dual role in prior art databases. All prior art primary keys defined for database reference tables are used to uniquely identify each instance of reference data (so that it can be accessed by a computer processor) and as the basis for linking the data contained in multiple database tables. This dual role for the primary key is a major problem. With prior art primary keys there is not enough isolation between the unique identification of reference data and the reference data's association to non-reference data. Therefore the reference data can not be changed independently without impacting the non-reference data as well.

It is difficult to remove redundant reference data, to merge reference data records, or to integrate data for multiple databases with these prior art dual purpose primary keys.

Generally prior art database maintenance methods were usually performed in an ad-hoc manner. That is they were not designed in advance. The database manager would simply do what he felt was appropriate to complete a task with no regard for any tasks that may be required in the future or as a result of any errors that were made in performing the original task.

For definition purposes in this application and as would be known to those skilled in the art a database table is a predefined data structure comprised of multiple predefined data fields or table columns. Each predefined data column has attributes associated with it such as the data type (character string, number, date, etc.) the data field length, the optionally, and more. Each row of the database table is a data record composed from the data field values. A database table many contain just a few data records or many thousands and sometimes millions of data records. As the number of data records increases, it becomes important to be able to access or find specific data records or groups of data records as quickly as possible. For this purpose we define "keys". A database table may contain many "keys" and each "key" is comprised of one or more data fields. There are several types of "keys" that have various purposes. Almost every database table has a primary key declared which is used to uniquely identify each and every data record. In addition, alternate keys may be declared to aid in the access of data records. These alternate keys are often used to uniquely identify data records as well. The primary key, however, has the additional distinction that other database tables often inherit it. When a database table inherits a primary key, that table receives a copy of the inherited primary key's data fields as part of its predefined data structure. This inherited primary key is called a foreign key in the table or tables that inherit it. The foreign key may then be unique or non-unique within a table.

From the database table point-of-view, the keys are predefined data structures. From the data value point-of-view, the keys are values that occupy these predefined data structures. It is the values that actually allow us to link data records. From the point-of-view of the data structure we refer to key columns or key attributes. From the point-of-view of the data values we refer to the key values.

SUMMARY OF THE INVENTION

The present invention overcomes the prior art primary key data-isolation deficiency which impacts one's ability to maintain one's data and thereby improve the quality of the data. The present invention provides "paired keys" to overcome and hopefully eliminate this data-isolation deficiency. Methods are provided which allow data to be reversed back to its original state. In other words, if a data record is modified the method allows a processor to undo the modification and return the data record to its original state.

The present invention provides for the following new data stewardship methods as a result of using paired keys to identify reference data:

Adding/Removing of paired keys

Transforming/Interpreting of paired keys

Declare Duplicate/Declare Unique Data Records

Merge/Split Data Records

Populate/Destroy Paired Keys

Isolate/integrate Data Records

Activate/Inactivate a Data Record

The present invention in one embodiment provides a plurality of data records, each data record having paired keys comprised of a first key and a second key. The first key is the declared primary key attributes of the data records. The purpose of the primary key in some embodiments is to uniquely identify links from the data records in the reference database table to data records in related database tables or to other data records in this reference database table or other reference database tables. The second key is comprised of one or more data fields that are used to locate the reference data record that should be associated to the link. Since the first key is the existing primary key of the reference table, it inherently links the original reference data record to the non-reference data.

This reference data pointed to by the second key may exist in the same table, a different table (via a non-identifying relationship) or even a different table in a different database. In the present invention, in some embodiments the reference data has been totally isolated from the non-reference data. This isolation means that modifications to be performed on reference data do not require changes to the non-reference data.

The present invention in one embodiment provides an apparatus comprising a processor and a computer memory. A first table of reference data records are stored in the computer memory, each reference data record comprised of a field of a first type, a field of a second type, and a field of a third type. In addition a first table of related data records are stored in memory, each related data record comprised of a field of a fourth type and a field of a fifth type. The fields of the first, second, third, fourth, and fifth type contain first, second, third, fourth, and fifth types of data, respectively. The first type of data in the fields of the first type are used by the processor to access the reference data records and this first type of data may be called a primary key. The fourth type of data of the related data records may be the same as the first type of data of the reference data records. Each instance of the first type of data in each field of the first type are used by the processor to access related data records which are linked to the particular reference data record and this first type of data may be called a primary key value (the "primary key" being a collection of primary key values).

The present invention may include in one embodiment a plurality of further tables of a plurality of further related data records stored in memory, each related data record comprised of a field of a fourth type and a field of a sixth type. The fields of sixth type may contain a sixth type of data. The fourth type of data of the plurality of further related data records may be the same as the first type of data of the reference data records. Each instance of the first type of data in each field of the first type may be used by the processor to access related data records which are linked to the particular reference data record.

The first type of data and the fourth type of data may be a customer identification number. An additional type of data may be provided to provide status information regarding particular reference data records, specify whether the particular reference data record is active or inactive, and/or specify whether a particular reference data record is a duplicate of another reference data record.

In one embodiment of the present invention a method is provided where fields of a third type and of a fourth type are added to each of a plurality of reference data records. The fields of a third type may be used as an alternate key to access each reference data record and the fields of a fourth type may be used as a second key to access a particular reference data record.

The present invention in some embodiments improves and maintains the quality of the data contained in the database. The present invention provides a new data architecture for making data consistent across databases without the need to integrate data from multiple databases into a single database.

The paired keys in accordance with the present invention may be added to any existing database reference table. This augments the functionality of the table as well as totally isolating the reference data from its related data.

BRIEF DESCRIPTION OF THE DRAWINGS

FIG. 1A shows a block diagram of a prior art data structure comprised of a customer record identified using a natural key related to a transaction record;

FIG. 1B represents prior art database tables that result from the implementation of the data structure of FIG. 1A;

FIG. 2A shows a block diagram of a prior art representation of a data structure comprised of a customer record identified using a surrogate key related to a transaction record;

FIG. 2B represents prior art database tables that result from the implementation of the data structure of FIG. 2A;

FIG. 3A shows a block diagram of a prior art representation of a data structure comprised of a party record identified by a surrogate, customer record identified using an inherited surrogate key and related to a transaction record;

FIG. 3B represents prior art database tables that result from the implementation of the data structure of FIG. 3A;

FIG. 3C represents prior art database tables that result from the implementation of the data structure of FIG. 3A where the party record has been combined with a customer record;

FIG. 4B represents database tables that result from the implementation of the data structure of FIG. 4A;

FIG. 4C represents database tables that result from the implementation of the data structure of FIG. 4A where the business party record has been combined with the customer record;

FIG. 5B represents database tables that result from the implementation of the data structure of FIG. 5A;

FIG. 5C represents database tables that result from the implementation of the data structure of FIG. 5A where the business party record has been combined with the customer record;

FIG. 6C represents database tables that result from the implementation of the data structure of FIG. 6A where the business party record and the party record have been combined with the customer record;

FIG. 7 shows a memory and a computer processor;

FIG. 8A shows a prior art pair of related tables that combine to show company annual sales;

FIG. 8B shows a prior art pair of related tables that contain data transformed from FIG. 8A where the Annual Sales to companies ABC and XYZ are restated or recasted to Company "ABCXYZ";

FIG. 10A shows two redundant tables containing data records from two isolated databases in accordance with a prior art technique;

FIG. 10B shows a database table containing data records integrated from the tables shown in FIG. 10A in accordance with a prior art technique for integrating multiple database tables;

FIG. 11A is the same as FIG. 10A;

FIG. 11B shows a database containing data records integrated from the tables shown in FIG. 10A in accordance with the present invention for integrating multiple database tables;

FIG. 12 shows the database tables from FIG. 10A after paired keys have been added;

FIG. 13 shows a list of data methods in accordance with the present invention and shows the workflow status values required before a data method may be executed;

FIGS. 14A and 14B show the before and after database values for the declare duplicate reference data method;

FIG. 18 shows before and after database values for the activate reference data method;

FIG. 20 shows before and after database values for the declare unique reference data method;

FIG. 21 shows before and after database values for the merge reference data method;

FIG. 22 shows before and after database values for the split reference data method;

FIG. 23 shows before and after database values the integrate reference data method;

FIG. 24 shows before and after database values for the isolate reference data method;

FIG. 28 shows before and after database values for the remove paired keys reference data method;

FIG. 29 shows before and after database values for the transform the paired keys reference data method;

FIG. 30 shows before and after database values for the interpret paired keys reference data method;

FIG. 31 shows before and after database values for the create reference data method;

FIG. 32 shows before and after database values for the delete reference data method;

FIG. 33 shows before and after database values for the populate reference data method; and FIG. 34 shows before and after database values for the destroy reference data method.

DETAILED DESCRIPTION OF THE DRAWINGS

Figure 4A:
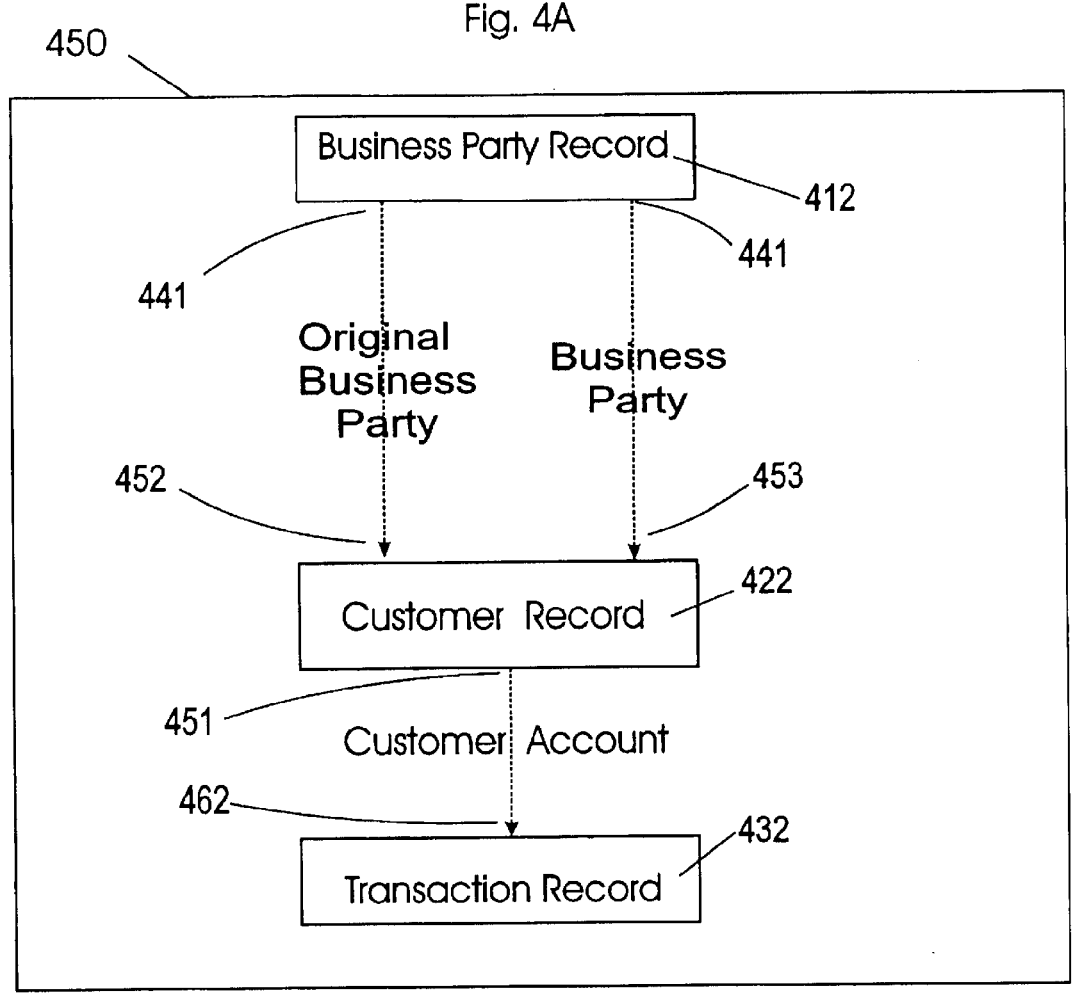
FIG. 4A shows a block diagram representation in accordance with the present invention of the data structure from FIG. 1A, with paired keys added.

FIG. 1A shows a block diagram 150 comprised of a customer record 113 linked to a transaction record 121. The customer record 113 is identified by a primary key attribute 141 which is linked to an inherited non-identifying foreign key attribute 132.

A relationship defines a link between "entities" or data records such as between customer record 113 and transaction record 121. This link is implemented by copying the primary key data field(s) or attribute(s) (which is a unique identifier of a data record) from one entity into another entity. The relationship also contains other pertinent information that is commonly referred to as business rules. In this example, the business rules would be stated as follows: (a) a customer record (such as record 113) may be linked to many transaction records (like record 121), (b) a transaction record (such as record 121) must be related to one and only one customer record. Business rules like (a) and (b) are often managed by the database management system and are specifically referred to as database constraints.

FIG. 1B shows prior art database 200 comprised of tables 110 and 120. The customer table 110 may be a table of values stored in a computer memory and may be comprised of a plurality of customer records. In FIG. 1B, the customer records 112, 113, and 114 are shown. Each customer record includes a customer account number shown in data column 141, a person name shown in data column 142, and other customer attributes shown in data column 143. For example, customer record 113 includes the customer account number 222-334444 (identified as primary key 141a) in column 141, a person name "Jane Green" in column 142, and other customer attribute "y" in column 143. Each entry in each column may be considered data of a particular type entered into a field of a particular type. Column 141 for example is comprised of three fields, each field having a different customer account number. The customer account number would be the "type" of data.

The transaction table 120 may be a table of values stored in a computer memory and may be comprised of a plurality of transaction records. In FIG. 1B, the transaction records 121, 122, 123, and 124 are shown. Each transaction record includes a transaction identification number shown in data column 131, a customer account number shown in data column 132, and other transaction attributes shown in data column 133. For example, transaction record 121 has a transaction identification number of "1" in data column 131, a customer account number of 22-334444 in data column 132, and other transaction attributes of "A" in data column 133.

In the FIGS. 1A–B prior art embodiment the natural primary key is the customer account number which in the case of customer record 113 is 222-334444 (identified as 141a). The same customer account number 222-33444 (identified as 132a) is inherited as a foreign key value in column 132 of transaction table 120. Each column of data in FIGS. 1A–B and in other Figs. to be described may actually be a series of locations in computer memory and is shown as a "column" for description purposes. Each location in a specific record and a specific column can be called a field.

In operation, the link between the natural primary key value 141a to inherited non-identifying foreign key value 132a, allows the customer record 113 to be linked to for example transaction record 121. FIG. 7 shows a system comprised of a computer processor 706 which may communicate to a memory 702 by a data bus 704. The memory 702 may contain the data of tables 110 and 120. The computer processor 706 can lookup or access the customer's name in customer table 110. If the computer processor 706 finds the name, then the computer processor 706 can retrieve the corresponding customer account number in the customer table 110, in this case "111-223333" for "Joe Green". The computer processor 706 can then look up this customer account number in the Customer Account Number column 132 of the transaction table 120 to determine what transactions have been associated with "Joe Green". In the example of FIGS. 1A and 1B no transactions have been associated with "Joe Green". Each data record of the customer table 110 may be linked by a primary key value to one or more data records of transaction table 120. This link or key value is comprised of the particular customer account number of column 141 of customer table 110 and the appropriate customer account numbers of column 132 of transaction table 120.

FIG. 2A shows a block diagram 250 representation of a prior art logical data model 250 comprised of a customer record 213 linked to a transaction record 222. The customer record 213 is identified by a surrogate key attribute (customer identification number) which is linked to an inherited non-identifying foreign key attribute (customer identification number).

FIG. 2B shows prior art database 200 comprised of tables 210 and 220. The customer table 210 may be a table of values stored in a computer memory and may be comprised of a plurality of customer records. In FIG. 2B, the customer records 212, 213, and 214 are shown. Each customer record includes a customer identification number shown in data column 231, a customer account number shown in data column 232, a person name shown in data column 233, and other customer attributes shown in data column 234. For example, customer record 213 includes a customer identification number "101" shown in data column 231, a customer account number "222-334444" shown in data column 232, a person name "Jane Green" shown in data column 233, and other customer attributes "y" shown in data column 234.

The transaction table 220 may be a table of values stored in a computer memory and may be comprised of a plurality of transaction records. In FIG. 2B, the transaction records 221, 222, 223, and 224 are shown. Each transaction record includes a transaction identification number shown in data column 241, a customer identification number shown in data column 242, and other transaction attributes shown in data column 243. For example, transaction record 221 has a transaction identification number of "1" in data column 241, a customer identification number of "101" in data column 242, and other transaction attributes of "A" in data column 243.

In the FIGS. 2A–B prior art embodiment the surrogate primary key for a particular data record is that record's customer identification number which in the case of customer record 213 is customer identification number 101 (identified as 231a). The same customer identification number (identified as 242a) is inherited as a foreign key attribute in column 242 of transaction table 220.

In operation, the link between the surrogate primary key value 231a (value "101") to inherited non-identifying foreign key value 242a (value "101"), allows the customer record 213 to be linked to for example transaction record 222 (and record 221). Again using the system of FIG. 7 for explanation purposes, the memory 702 may contain the data of tables 210 and 220. The computer processor 706 can lookup the customer's name in customer table 210. If the computer processor 706 finds the name, then the computer processor 706 can retrieve the corresponding customer identification number in the customer table 210, for example, "100" for "Joe Green". The computer processor 706 can then look up this customer identification number in column 242 of the transaction table 220 to determine what transactions have been associated to "Joe Green". In the example of FIGS. 2A and 2B no transactions have been associated to "Joe Green". Each data record of the customer table 210 may be linked by the primary key value to one or more data records of transaction table 220. This link is comprised of the particular customer identification number of column 231 of customer table 210 and the particular customer identification numbers of column 242 of transaction table 220.

FIG. 3A shows a block diagram representation of a prior art data structure 350 comprised of a party record 313 linked to a customer record 322 which is linked to a transaction record 332. The party record 313 is identified by a surrogate key attribute 341 which is linked to an inherited identifying foreign key attribute 351 of the customer record 322. The customer record 322 is identified by a subtype inherited surrogate key attribute 351 which is linked to an inherited non-identifying foreign key attribute 362 of the transaction record 332.

FIG. 3B shows prior art database 300 comprised of tables 310, 320, and 330. The party table 310 may be a table of values stored in a computer memory and may be comprised of a plurality of party records 312, 313, and 314. Each party record includes a party identification number shown in data column 341 and other party attributes shown in data column 342. For example, party record 313 includes a party identification number "101" shown in data column 341 and other party attributes "yyy" shown in column 342 of table 310.

The customer table 320 may be a table of values stored in a computer memory and may be comprised of a plurality of customer records 321, 322, and 323. Each customer record includes a party identification number shown in data column 351, customer account number shown in data column 352, person name shown in column 353, and other customer attributes shown in column 354. For example, the customer record 322 includes a party identification number "101" shown in data column 351, a customer account number of "222-334444" in column 352, a customer name of "Jane Green" in column 353, and other customer attributes of "y" in column 354.

The transaction table 330 may be a table of values stored in a computer memory and may be comprised of a plurality of transaction records. In FIG. 3B, the transaction records 331, 332, 333, and 334 are shown. Each transaction record includes a transaction identification number shown in data column 361, a party identification number shown in data column 362, and other transaction attributes shown in data column 363. For example, transaction record 331 has a transaction identification number of "1" in data column 361, a party identification number of "101" in data column 362, and other transaction attributes of "A" in data column 363.

In the FIGS. 3A–B prior art embodiment the subtype inherited surrogate primary key for each party record is the party identification number which in the case of customer record 313 is party identification number "101" (identified as 341a). The same party identification number (identified as 351a) is inherited as an identifying foreign key attribute in column 351 of customer table 320. In customer table 320 the party identification 351a for number "101" also acts as a primary key value for linking with the data records (362a) transaction table 330. The transaction table inherits the primary key in this example as party identification number "101".

In operation, the link between the primary key value 341a to inherited identifying foreign key value 351a, allows the party record 313 to be linked to for example customer record 322. Similarly the link between the primary key value 351a of the customer record 322 and the inherited value 362a of the transaction record 332 allows the customer record 322 to be linked to the transaction record 332. Again using the system of FIG. 7 for explanation purposes, the memory 702 may contain the data of tables 310, 320, and 330. The computer processor 706 can lookup the party's identification number in party table 310. If the computer processor 706 finds the number, then the computer processor 706 can retrieve the person name corresponding to the party identification number in the customer table 320, for example, "Joe Green" for "100". The computer processor 706 can also look up transactions for the customer identification number "100" in column 362 of the transaction table 330 to determine what transactions have been associated to "Joe Green". In the example of FIGS. 3A and 3B no transactions have been associated to "Joe Green". Each data record of the party table 310 may be linked by the primary key value to one data record of customer table 320. This link is comprised of a party identification number of column 341 of party table 310, and the corresponding party identification numbers of column 351 of customer table 320. Similarly each customer table data record of table 320 may be linked by the primary key value to one or more data records of the transaction table 330. The link is comprised of a party identification number of column 351 of the customer table 320, and the corresponding party identification numbers of column 361 of the transaction table 330.

FIG. 3C shows database 380 whose transaction table 330 is the same as in FIG. 3B. FIG. 3C also shows customer table 370 which is the same as customer table 320 except for an added data column 394 regarding other party attributes. Otherwise data columns 391, 392, 393, and 395 in FIG. 3C correspond to data columns 351, 352, 353, and 354 in FIG. 3B respectively.

FIG. 4A shows a block diagram representation of a data structure 450 comprised of a business party record 412 which is linked to a customer record 422 which is linked to a transaction record 432. FIG. 4A is basically FIG. 1A with paired keys added. The business party record 412 is identified by a surrogate primary key attribute 441 which is linked to inherited non-identifying foreign key attributes 452 and 453 as shown in FIG. 4A. The customer record 422 is identified by a natural primary key attribute 451 which is linked to an inherited non-identifying foreign key attribute 462 of the transaction record 432.

FIG. 4B shows database 400 comprised of tables 410, 420, and 430. The business party table 410 may be a table of values stored in a computer memory and may be comprised of a plurality of business party records. In FIG. 4B, the business party records 411, 412, and 413 are shown. Each business party record includes a business party identification number shown in data column 441 and other business party attributes shown in data column 442. For example, business party record 412 includes the business party identification number "51" in data column 441, and other business party attribute "bbb" in data column 442.

The customer table 420 is the same as the prior art customer table 110 in FIG. 1B except table 420 includes added columns 452, 453, and 454. These columns are for the "paired keys" attributes (business party identification number in column 452 and original business party identification number in column 453 and for the record workflow status in column 454).

In FIG. 4B, the customer records 421, 422, and 423 are shown. Each customer record includes a customer account number shown in data column 451, a business party identification number shown in data column 452, original business party identification number shown in data column 453, a workflow status shown in data column 454, a person name shown in data column 455 and other customer attributes shown in data column 456. For example, customer record 422 includes the customer account number "222-334444" (identified as primary key value 451*a*) in column 451, a business party identification number "51" (identified as 452*a*) and shown in data column 452, an original business party identification number "51" (identified as 453*a*) and shown in data column 453, a record workflow status "Active" shown in column 454, a person name "Jane Green" shown in column 455, and other customer attributes "y" shown in column 456.

In the customer table 420 of FIG. 4B, the customer account 451, the person name 455 and the other customer attributes 456 are equivalent to the columns of customer table 110 of FIG. 1B identified as 141, 142, and 143, respectively. The additional columns of customer table 420 have been added to support the use of paired keys. These columns are the business party identifier column 452, the original business party identifier column 453, and the workflow status column 454. Each business party identifier in the data column 452 is the second key of the paired keys in that it identifies the reference data record that currently is associated to the link defined by the primary key column (Customer Account). Each original business party identifier in column 453 is the alternate key column for this table and is used to identify the "booked" or original reference data record. This column allows us to reverse data methods because we retained the original value. The original business party identifier in column 453 uniquely identifies reference data records and therefore can be used by a processor (such as processor 706 in FIG. 7) to access a particular reference data record. Each workflow status in column 454 tells us what data methods have been performed on the particular data record and determines what data methods may next be performed on the particular data record.

The transaction table 430 may be a table of values stored in a computer memory and may be comprised of a plurality of transaction records. In FIG. 4B, the transaction records 431, 432, 433, and 434 are shown. Each transaction record includes a transaction identification number shown in data column 461, a customer account number shown in data column 462, and other transaction attributes shown in data column 463. For example, transaction record 431 has a transaction identification number of "1" in data column 461, a customer account number of "22-334444" in data column 462, and other transaction attributes of "A" in data column 463.

FIG. 4C shows database 490 comprised of tables 480 and 430. The table 480 is an alternative embodiment which replaces the tables 410 and 420 of FIG. 4B. In FIG. 4C, the customer records 481, 482, and 483 are shown. Each customer record includes a customer account number shown in data column 491, a business party identification number shown in data column 492, original business party identification number shown in data column 493, a workflow status shown in data column 494, a person name shown in data column 495, other business party attributes shown in data column 496, and other customer's attributes in data column 497. For example, customer record 482 includes the customer account number "222-334444" in column 491, a business party identification number "51" shown in data column 492, an original business party identification number "51" shown in data column 493, a workflow status "Active" shown in column 494, a person name "Jane Green" shown in column 495, other business party attributes "bbb" in data column 496, and other customer attributes "y" shown in column 497.

The transaction table 430 is the same as table 120 of FIG. 1B. It is important to note that adding paired keys does not impact the transaction table 430 or any other non-reference table. That is part of the data isolation characteristic of the present invention.

The operation of using the database tables of FIG. 4C is somewhat similar to the prior art operation of FIG. 1B, with the exceptions that the paired keys have been added. Adding paired keys to an existing database, such as to table 110 in FIG. 1B, adds functionality for allowing specific changes to the data that are not supported by the prior art. These specific changes are detailed in the data methods of the present invention that will be defined. In accordance with an embodiment of the present invention, if we discover that Jane Green and Mrs. Bob Fox are the same customer (for example a maiden name), then the declare duplicate data method would be performed to correct the data. The results are shown in FIG. 4D.

Figure 4D:
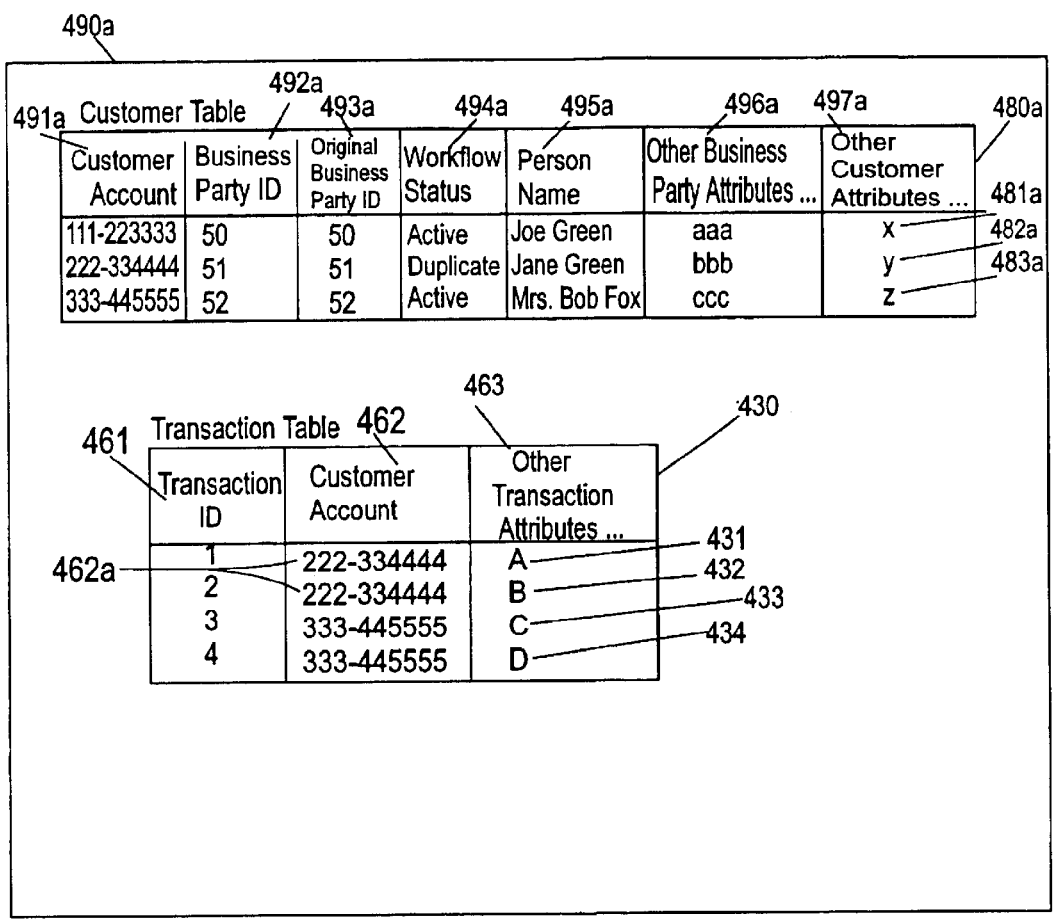
FIG. 4D represents database tables that result after a declare duplicate data method is performed on the database tables of FIG. 4C.

FIG. 4D shows a data structure 490*a*. The transaction table 430 is the same, however the customer table has changed and is now identified as 480*a*. The columns are identified as columns 491*a*–497*a* and the records are identified as 481*a*–483*a*. The business party identification in column 492*a* for Jane Green is now "52" changed from "51" in column 492 of FIG. 4C. The record workflow status for Jane Green is now "Duplicate" in column 494*a* of FIG. 4D changed from "Active" in column 494 of FIG. 4C. Note that the primary key values in FIG. 4D (the customer account numbers in column 491*a*) have not been changed from FIG. 4C and no data was modified in the transaction table 430. Note that in this example the "paired keys" (values in columns 492a and 493a) are in addition to the prior art primary keys (values in columns 491a).

In operation, a processor such as processor 706 of FIG. 7 in order to find the transactions for Mrs. Bob Fox would first determine her original business party identification from column 493a which in this case is "52". Then the processor 706 would retrieve all customer data records where the business party identification in column 492a is equal to "52". This would be data record 482a and 483a. Finally the link is made between the two data records 482a and 483a and the transactions in the transaction table 430. This link utilizes the common customer account columns 491a in table 480a and 462 in table 430. Data record 482a links with data records 431 and 432 while data record 483a links with data records 433 and 434. Thus all the appropriate transactions are associated with Mrs. Bob Fox who now has customer accounts "222-334444" and "333-445555".

It is important to know that the above process is reversible. If there was a mistake in declaring Jane Green as a duplicate of Mrs. Bob Fox, this can be reversed by executing the "Declare Unique Data Method", this would reset the "workflow status" value to "active" and make the business party identification value equal to the original business party identification value of "51".

FIG. 13 shows a list 1300 of data methods in accordance with the present invention and shows the workflow status values required before a data method may be executed and the workflow status values that result from the successful completion of the data method. Column 1302 identifies the reference data method. Column 1304 identifies the workflow status prior to execution of the method and column 1306 identifies the workflow status after execution of the method.

The following is an explanation of how using paired keys works referring to FIG. 4C. The "Workflow status" in column 494 indicates what has happened to the particular customer table record such as record 482 since it was "booked" (also called "original") data. In the table 480 since the value in the column 494 for record 482 for workflow status is "Active", this means that the current data view is the same as the "booked" or original data. The same is true for records 481 and 483. The original business party identification numbers in column 493 once assigned may not change in this embodiment. The original business party identification number is an alternate key attribute, which means that it may be used to uniquely identify the data records just like the primary key attribute(s) (shown in column 491, i.e. customer account numbers) are used. The business party identification number (the second key of the paired keys) in column 492 are allowed to change and they point to a data record in this table that is the current reference data record. For record 482, the business party identification number "51" identified as 492a points to the same data record 482. The business party identification number 492a in column 492 will continue to point to its own data record 482 as long as no changes have occurred via data methods to the data record 482.

The following is an example of a data method in accordance with the present invention where a data record is declared as redundant, FIG. 14A shows database 1400 before a declare duplicate reference data method and FIG. 14B shows database 1400a (modified from 1400) after such as method. A database table can be defined as a predefined data structure comprised of data columns or data fields. Each column in the database table represents a single data element or fact that we may wish to record. These columns are aligned vertically in our database table representations. In tables that have "Other customer attributes . . . " for example, this represents any other data elements that you may wish to add. A data record is represented by a single row in the table that is a single instance of what is defined by our database table. Each data record is most often uniquely identified by what we declare as the primary key column (s). FIG. 14A shows business party table 1410 which includes columns 1431, 1432, and 1433 and records 1411 and 1412 and person table 1420 which includes columns 1441-7 and records 1421 and 1422. FIG. 14B shows business party table 1410a which includes columns 1431a, 1432a, and 1433a and records 1411a and 1412a and person table 1420a which includes columns 1441a–7a and records 1421a and 1422a.

The person data record 1421a was declared to be redundant as shown by the "Duplicate" indication in the workflow status column 1444a of FIG. 14B. The business party identification number in column 1442a for record 1421a was changed from "100000000" in FIG. 14A to "100000004" in FIG. 14B. This change means that all transaction data that is associated to customer identification number value "47" shown in column 1441a for record 1421a and was originally "booked" for "Joe Green" must in the current data view of FIG. 14B be associated to "Joseph Green" who has a customer identification number value of "114" in column 1441a for record 1422a. "Joseph Green" is the "active" data record for Business Party ID "100000004". Essentially, this configuration causes the transaction data records (similar to those in table 430 in FIG. 4C) for the reference data record 1421a identified by the value "47" to be redirected to the reference data record 1422a identified by the value "114" without requiring a change to the transaction data records inherited foreign key values. For, example, inherited foreign key values in column 462a of FIG. 4C showing customer account numbers would not have to be changed.

If more than one reference data record is used to define the same instance of reference data, these data records may be considered synonyms of each other. We can therefore use the paired key values to declare these reference data records as duplicates. The declare duplicate reference data method is used to "logically remove" redundant reference data definitions from the database. That is the data record still exists in the active database but only as an inactive data record. Record 1421a as shown in FIG. 14B is an inactive "duplicate" data record as indicated in column 1444a.

In order to declare duplicate reference data records, the paired key value in column 1442 of FIG. 14A must be updated (to 1442a) of FIG. 14B. The reference data record (such as record 1421) that is not selected as the active synonymous reference data record from the group of declared duplicate data records, is updated (to for example 1421a in FIG. 14B). The following steps are followed to accomplish this.

First, the processor (such as processor 706 in FIG. 7) checks to see if the workflow status value in column 1444 is "Active" for the data record that was selected to declare as a duplicate reference data record (such as record 1421). If the status is not "Active", the data method is aborted. A reference data record normally could only be declared as a duplicate if its "workflow status" is "Active".

Second, the processor checks to see if the workflow status value in column 1444 is "Active" for the data record that will be selected to be an Active synonymous record (such as record 1422). If this is not the case, the data method is also aborted.

Third, the processor checks to see if no other reference data record is using the selected duplicate data record (in this case 1421 to become 1421 a). The "Business Party Identification" for record 1421 shown in column 1442 of FIG. 14A needs to be unique. In FIG. 14A prior to the declare duplicate operation the number "100000000" is unique. However in FIG. 14B the number is not unique. It would not be possible to change the record 1422*a* to a duplicate record because another reference data record (1421*a*) is using the reference data record 1422*a*. If the value for the business party identification is not unique prior to the "declare duplicate operation", the data method is aborted. In this embodiment, the processor is not permitted to change the "workflow status" value of a data record (such as record 1422*a*) that is used as the "Active" data record by another reference data record.

Fourth, the processor updates the "workflow status" value to "Duplicate" (from record 1421 to 1421*a*) for the record selected to be the duplicate. In addition the business party identification number in column 1442 is updated to column 1442*a* to equal the value of the business party identification of the active synonymous reference data record (1422*a*). Now the duplicate reference data record 1421*a* is linked with its active synonymous reference data record 1422*a*.

Fifth, the processor performs a database commit. A database commit is a way to finalize your work in the database. When a processor or a user aborts a data method, it does a database rollback that returns the database to its original state before the task was begun. A commit tells the database to make all the changes final. This means that the task has been completed.

From the non-reference point of view the processor continues to associate the non-reference data records (records similar to those transaction records in table 430 of FIG. 4C) with their appropriate reference data record (records similar to customer record 1421*a*). This is advantageous because we may need to reverse the declare duplicate reference data method. In order, to successfully reverse this reference data method we need to also know which associated non-reference data should be associated to which reference data record.

Figure 5A:
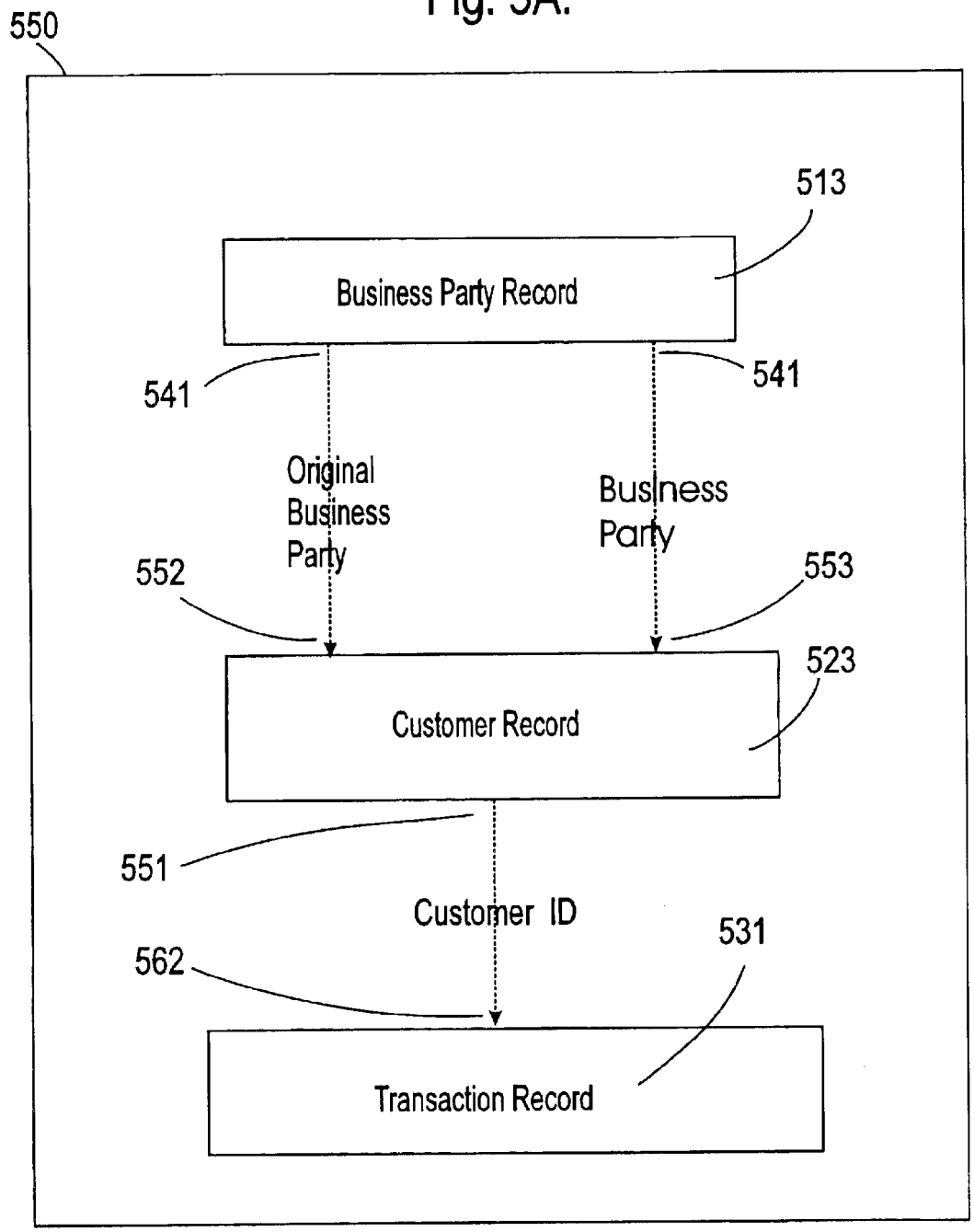
FIG. 5A shows a block diagram representation in accordance with the present invention of the data structure from FIG. 2A with paired keys added.

FIG. 5A shows a block diagram representation 550 comprised of a business party record 513 which is linked to a customer record 523 which is linked to a transaction record 531. The business party record 513 is identified by a surrogate primary key attribute 541 which is linked to inherited non-identifying foreign key attributes 552 and 553 of customer record 523 as shown in FIG. 5A. The customer record 523 is identified by a surrogate primary key attribute 551 which is linked to an inherited non-identifying foreign key attribute 562 of the transaction record 531.

FIG. 5B shows database 500 comprised of tables 510, 520, and 530. The business party table 510 may be a table of values stored in a computer memory and may be comprised of a plurality of business party records. In FIG. 5B, the business party records 511, 512, and 513 are shown. Each business party record includes a business party identification number shown in data column 541 and other business party attributes shown in data column 542. For example, business party record 513 includes the business party identification number "52" (identified as 541*a*) in data column 541, and other customer attribute "ccc" in data column 542.

The customer table 520 may be a table of values stored in a computer memory and may be comprised of a plurality of customer records. In FIG. 5B, the customer records 521, 522, and 523 are shown. Each customer record includes a customer identification number shown in data column 551, a business party identification number shown in data column 552, original business party identification number shown in data column 553, a record workflow status shown in data column 554, a person name shown in data column 555, a customer account number shown in data column 556, and other customer attributes shown in data column 557. For example, customer record 523 includes the customer identification number "102" (identified as primary key value 551*a*) in column 551, a business party identification number "52" (identified as 552*a*) and shown in data column 552, an original business party identification number "52" (identified as 553*a*) and shown in data column 553, a record workflow status "Active" shown in column 554, a customer name "Mrs. Bob Fox" shown in column 555, a customer account number "333445555" shown in column 556, and customer attributes "z" shown in column 557.

The transaction table 530 may be a table of values stored in a computer memory and may be comprised of a plurality of transaction records. In FIG. 5B, the transaction records 531, 532, 533, and 534 are shown. Each transaction record includes a transaction identification number shown in data column 561, a customer identification number shown in data column 562, and other transaction attributes shown in data column 563. For example, transaction record 531 has a transaction identification number of "1" in data column 561, a customer identification number of "102" in data column 562, and other transaction attributes of "A" in data column 563.

FIG. 5C shows database 590 comprised of tables 580 and 530. The table 580 is an alternative embodiment which replaces the tables 510 and 520 of FIG. 5B. In FIG. 5C, the customer records 581, 582, and 583 are shown. Each customer record includes a customer identification number shown in data column 591, a business party identification number shown in data column 592, original business party identification number shown in data column 593, a workflow status shown in data column 594, a person name shown in data column 595, customer account number in data column 596, other business party attributes shown in data column 597, and other customer's attributes in data column 598. For example, customer record 582 includes the customer identification number "101" in column 591 (identified as 591*a*), a business party identification number "52" shown in data column 592, an original business party identification number "51". shown in data column 593, a record workflow status "Duplicate" shown in column 594, a person name "Jane Green" shown in column 595, a customer account number "222334444" shown in column 596, other business party attributes "bbb" in data column 597, and other customer attributes "y" shown in column 598.

The transaction table 530 is the same as previously.

Figure 6A:
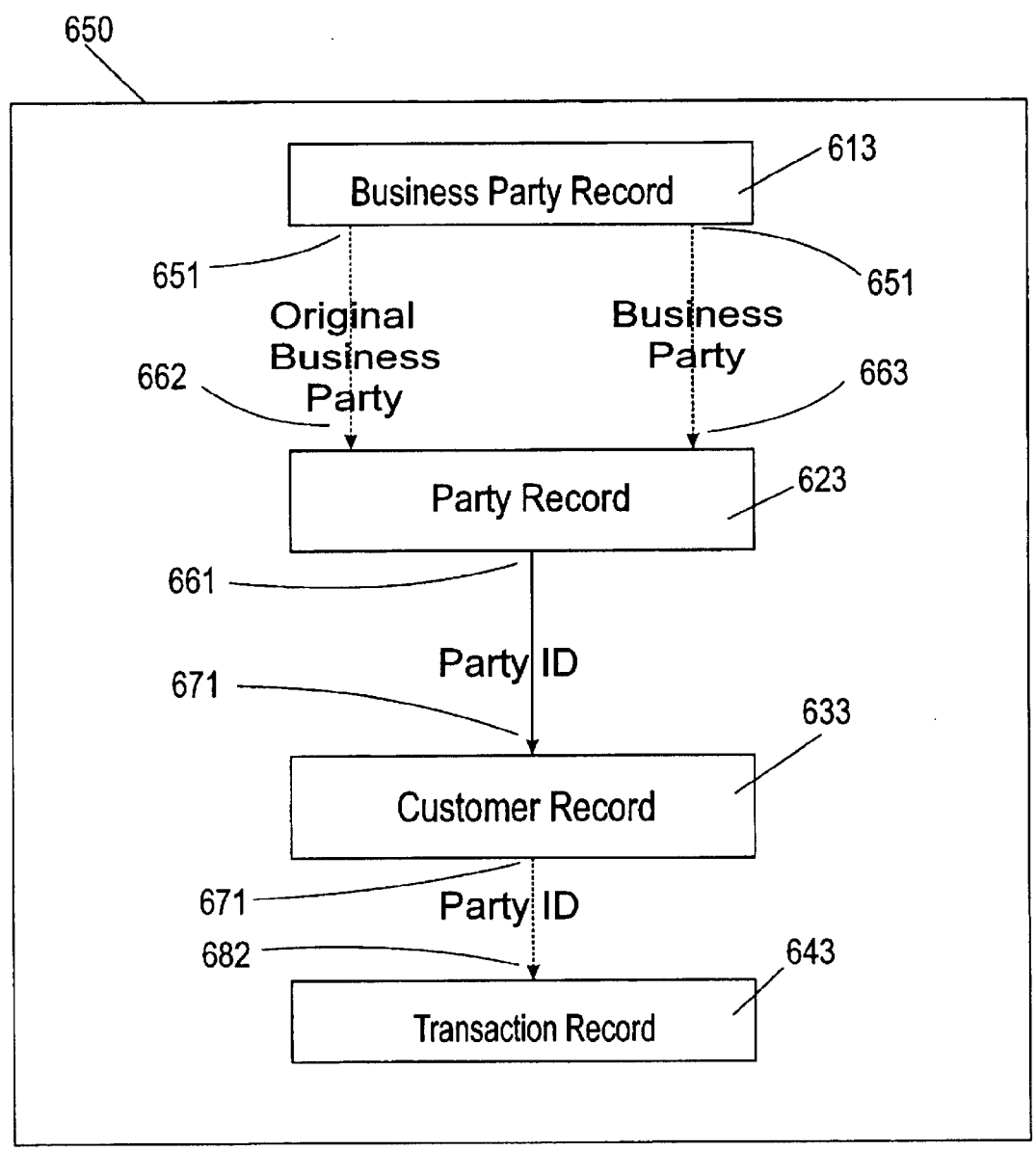
FIG. 6A shows a block diagram representation in accordance with the present invention of a data structure from FIG. 3A with paired keys added.

FIG. 6A shows a block diagram representation of a data structure 650 comprised of a business party record 613 which is linked to a party record 623 which is linked to a customer record 633 which is linked to a transaction record 643. The business party record 613 is identified by a surrogate primary key attribute 651 which is linked to inherited non-identifying foreign key attributes 662 and 663 of the party record 623. The party record 623 contains the paired keys and is linked by primary key attribute 661 to the inherited foreign key attribute 671 of the customer record 633. The customer record 633 is linked by primary key attribute 671 to the inherited key attribute 682 of the transaction record 643.

Figure 6B:
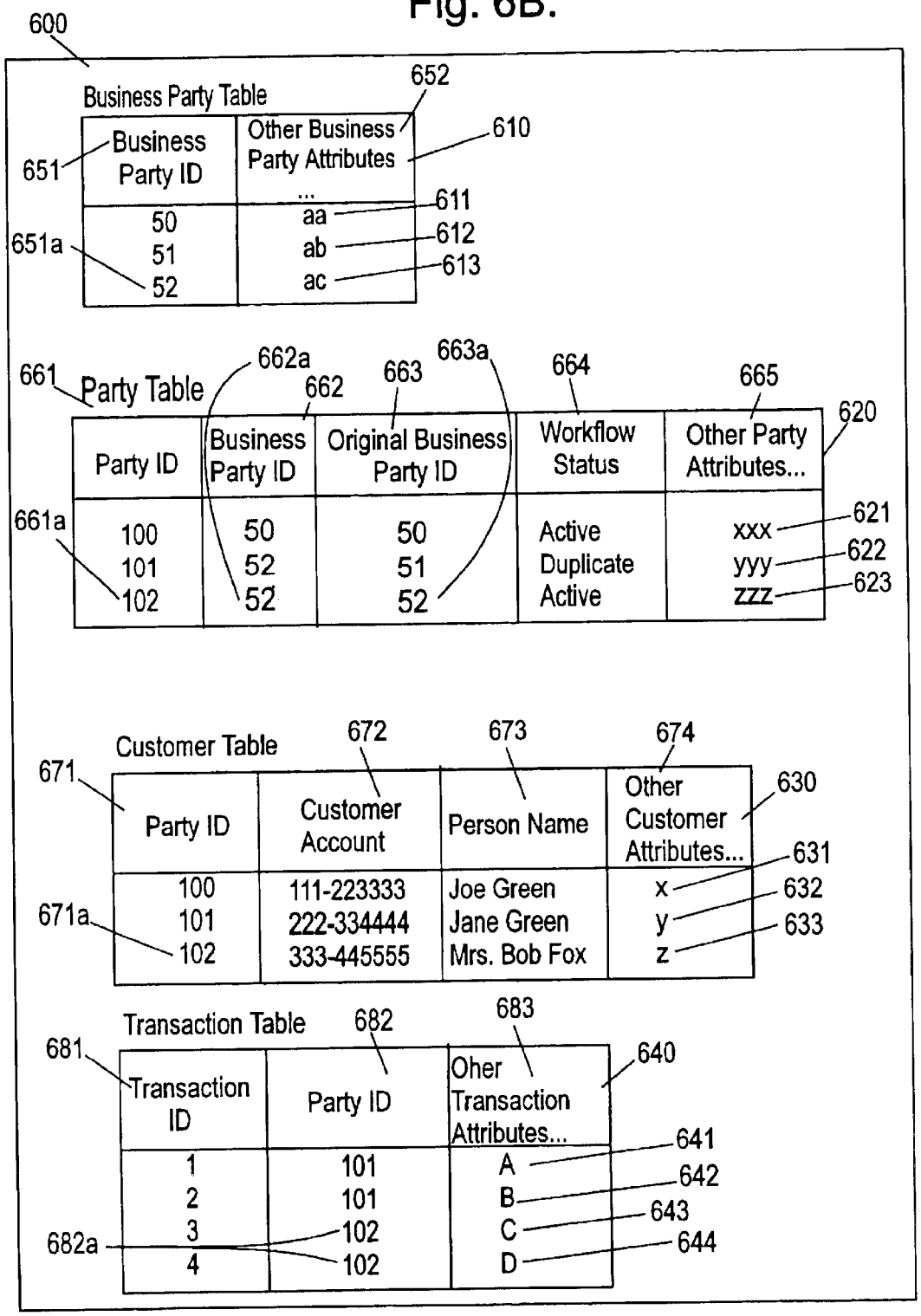
FIG. 6B represents database tables that result from the implementation of the data structure of FIG. 6A.

FIG. 6B shows database 600 comprised of tables 610, 620, 630, and 640. The business party table 610 may be a table of values stored in a computer memory and may be comprised of a plurality of business party records. In FIG. 6B, the business party records 611, 612, and 613 are shown. Each business party record includes a business party identification number shown in data column 651 and other business party attributes shown in data column 652. For example, business party record 613 includes the business party identification number "52" (identified as 651a) in data column 651, and other business party attribute "ac" in data column 652.

The party table 620 may be a table of values stored in a computer memory and may be comprised of a plurality of customer records. In FIG. 6B, the party records 621, 622, and 623 are shown. Each party record includes a party identification number shown in data column 661, a business party identification number shown in data column 662, original business party identification number shown in data column 663, a workflow status shown in data column 664, and other party attributes shown in data column 665. For example, party record 623 includes the party identification number "102" (identified as primary key 661a) in column 661, a business party identification number "52" (identified as 662a) and shown in data column 662, an original business party identification number "52" (identified as 663a) and shown in data column 663, a workflow status "Active" shown in column 664, and other party attributes "zzz" shown in data column 665.

The customer table 630 may be a table of values stored in a computer memory and may be comprised of a plurality of customer records. In FIG. 6B, the customer records 631, 632, and 633 are shown. Each customer record includes a party identification number shown in data column 671, a customer account number in data column 672, a person name in column 673, and other customer attributes in data column 674. For example, customer record 633 includes the party identification number "102" (identified as primary key 671a) in column 671, a customer account number "333445555" shown in data column 672, a customer name "Mrs. Bob Fox" shown in column 673 and other customer attributes "z" shown in column 674.

The transaction table 640 may be a table of values stored in a computer memory and may be comprised of a plurality of transaction records. In FIG. 6B, the transaction records 641, 642, 643, and 644 are shown. Each transaction record includes a transaction identification number shown in data column 681, a party identification number shown in data column 682, and other transaction attributes shown in data column 683. For example, transaction record 643 has a transaction identification number of "3" in data column 681, a party identification number of "102" (identified as 682a) in data column 682, and other transaction attributes of "C" in data column 683.

FIG. 6C shows database 690 comprised of tables 680 and 640. Database table 640 is the same as previously described. Database table 680 is an alternative embodiment which replaces the tables 610, 620 and 630 of FIG. 6B. In FIG. 6C, the customer records 691, 692a, and 692b are shown. Each customer record includes a party identification number shown in data column 693, a business party identification number shown in data column 694, original business party identification number shown in data column 695, a workflow status shown in data column 696, customer account number in data column 697, a person name shown in, data column 698, other party attributes shown in data column 699a, other customer attributes in data column 699b, and other business party attributes 699c. For example, customer record 692a includes a party identification number "101", a business party identification number "52"shown in data column 694, an original business party identification number "51"shown in data column 695, a record workflow status "Duplicate" shown in column 696, a customer account number "222-334444" in data column 697 a customer name "Jane Green" shown in column 698, other party attributes "yyy" in data column 699a, and other customer attributes "y" shown in column 699b and other business party attributes "ab" in 699c.

FIGS. 8A and 8B show prior art techniques for merging two data records. FIG. 8A shows a database 800 comprised of company table 810 and an annual sales table 820. The table 810 is comprised of data records 811, 812, and 813, and data columns 831, 832, and 833. The table 820 is comprised of data records 821, 822, 823, 824, and 825 and data columns 841, 842, 843, and 844. The data record 813 is a new data record added to show a merger of companies "ABC" and "XYZ" into "ABCXYZ". The data record 825 in table 820 is also a data record for the new company "ABCXYZ". This prior art technique is disadvantageous because there is no information about there being a merger.

FIG. 8B shows a database 800a comprised of company table 810a and an annual sales table 820a. The table 810a is comprised of data records 811a, 812a, and 813a and data columns 831a, 832a, and 833a. The table 820a is comprised of data records 821a and 822a and data columns 841a, 842a, 843a, and 844a. The data record 821a in FIG. 8B is a combination of prior data records 821 and 822 in FIG. 8A and the data record 822a in FIG. 8B is a combination of prior data records 823, 824, and 825 in FIG. 8A. This prior art technique is disadvantageous because the history of the prior companies before the merger is wiped out and cannot be recovered. In addition, sometimes data records 811a and/or 812a are deleted.

Figure 9A:
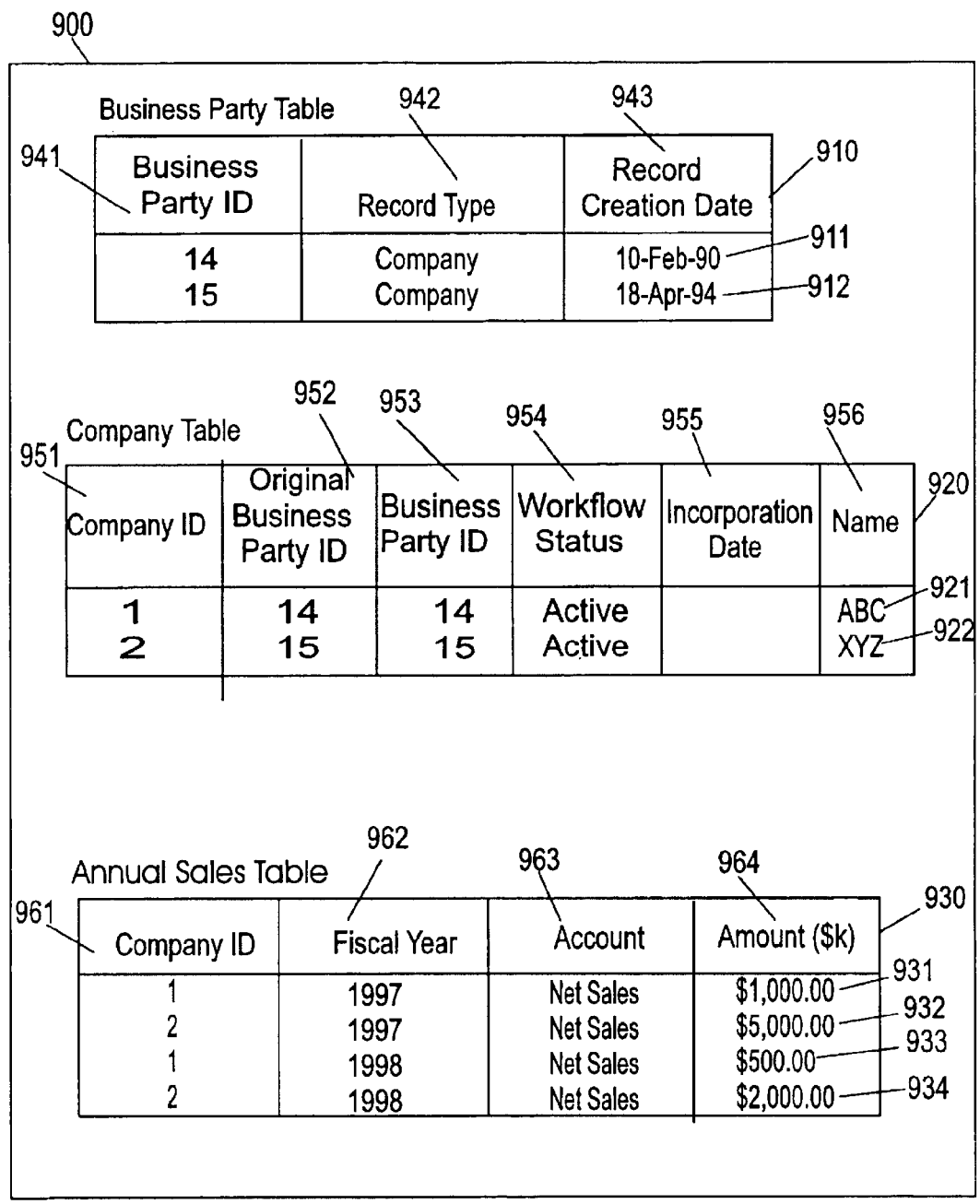
FIG. 9A shows a collection of related tables in accordance with the present invention where the database values for the annual sales for two companies are shown.

FIG. 9A shows a database 900 comprised of a collection of tables in accordance with a method of the present invention. FIG. 9A shows tables 910, 920, and 930. Table 910 has data records 911, and 912 and data columns 941, 942, and 943. Table 920 has data records 921, and 922 and data columns 951, 952, 953, 954, 955, and 956. Table 930 has data records 931, 932, 933, and 934 and data columns 961, 962, 963, and 964. FIG. 9A is the state of these tables prior to merging data records.

Figure 9B:
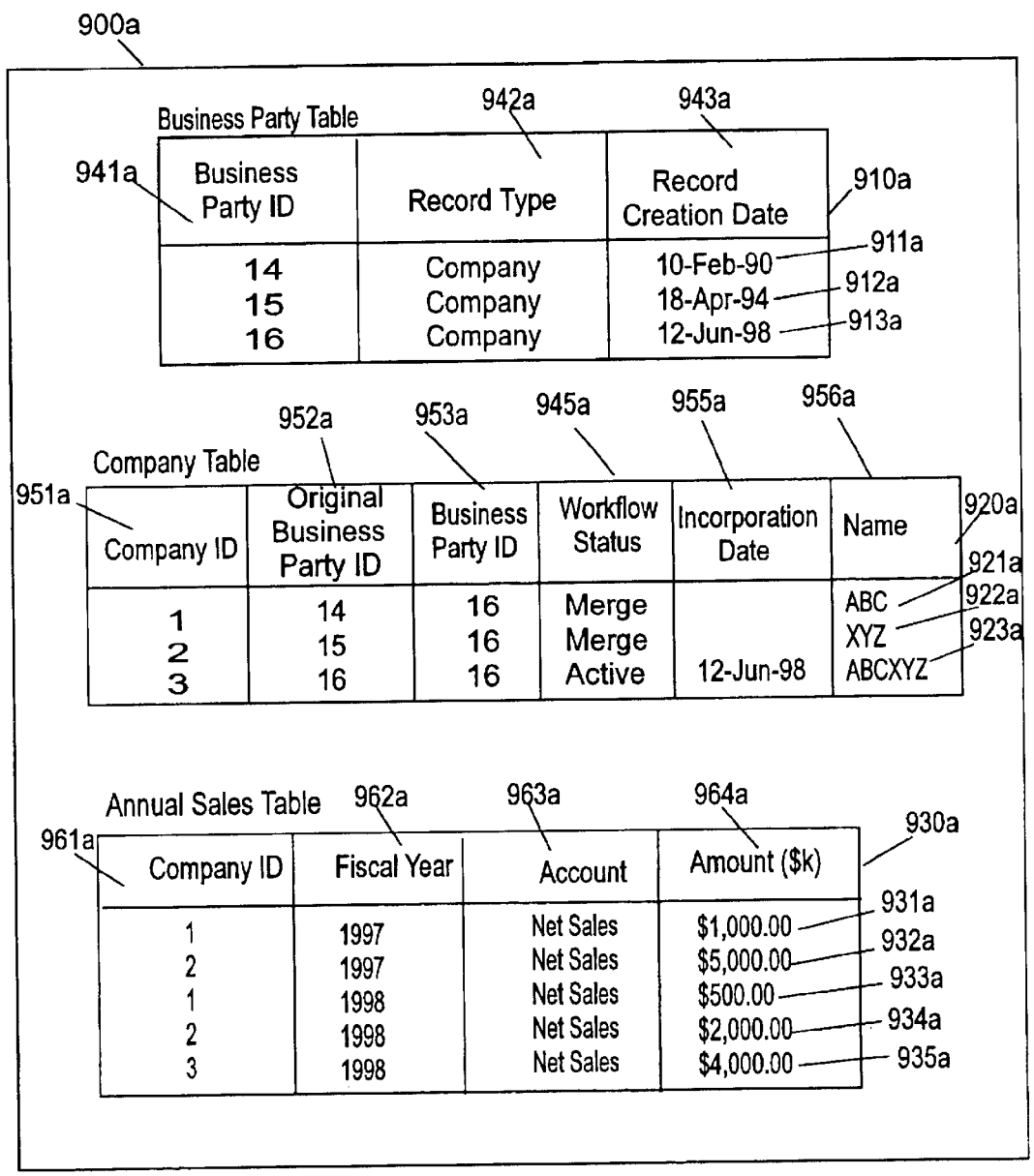
FIG. 9B shows the tables of FIG. 9A after a merger between the two companies has occurred as reflected in the database values.

FIG. 9B shows a database 900a comprised of a collection of tables in accordance with the present invention after a merger of the two companies' data records. FIG. 9B shows tables 910a, 920a, and 930a. Table 910a has data records 911a, 912a, and added data record 913a for the new merged entity company "16" and data columns 941a, 942a, and 943a. Table 920a has data records 921a, 922a, and added data record 923a for the newly merged company and data columns 951a, 952a, 953a, 954a, 955a, and 956a. Table 930a has data records 931a, 932a, 933a, 934a and added data record 935a for the newly merged company and data columns 961a, 962a, 963a, and 964a.

In contrast with the prior art technique of FIG. 8B (table 810a), the table 920a of FIG. 9B includes an original party identification in column 952a, a business party identification in column 953a and a workflow status in column 954a indicating the merger status. The data in columns 952a and 953a function to allow the original information to be retained while the new information is tabulated.

FIG. 10A shows database 1000 and database 1000a comprised of prior art collection of tables of data records before an integration of database systems. FIG. 10A shows database 1000 which is comprised of system "A" person table 1010 and database 1000a which is comprised of system "B" person table 1020. The system "A" person table 1010 is comprised of data records 1011, 1012, and 1013 and data columns 1031, 1032, and 1033. The system "B" person table 1020 is comprised of data records 1021, 1022, and 1023 and data column 1041, 1042, 1043, and 1044.

FIG. 10B shows a database 1055 containing a prior art integrated person table 1050 after the integration of systems "A" and "B" of FIG. 10A. The integrated person table 1050 includes data records 1051, 1052, 1053, and 1054 and data columns 1061, 1062, 1063, and 1064. FIGS. 10A and 10B show prior art techniques for integrating two databases. The data from both databases 1000 and 1000a is extracted, transported to a new database (database 1055), and then transformed into a new integrated database table (which is 1055). A new person identification number is created in data column 1061 of FIG. 10B and the old identification numbers in column 1031 and 1041 of FIG. 10A are not recorded in the new data structure. The identification numbers in column 1061 are the primary key values for this table 1050. Because the primary key values are changed all non-reference data must have their inherited foreign key values changed. There may be hundreds or thousands of such data records.

FIG. 11A shows database 1100 and database 1100a comprised of a collection of tables of data records before a merge of database systems in accordance with the present invention. FIG. 11A shows database 1100 comprised of system "A" person table 1110 and database 100a shows system "B" person table 1120. The system "A" person table 1110 is comprised of data records 1111, 1112, and 1113 and data columns 1131, 1132, and 1133. The system "B" person table 1120 is comprised of data records 1121, 1122, and 1123 and data column 1141, 1142, 1143, and 1144. FIG. 11A is the same as FIG. 10A.

FIG. 11B shows a database 1190 which contains an integrated enterprise person table 1150 after the integration of systems "A" and "B" of FIG. 11A. The integrated enterprise customer table 1150 includes data records 1151, 1152, 1153, 1154, 1155, 1156, and 1157 and data columns 1161, 1162, 1163, 1164, 1165, 1166, 1167, and 1168. In FIG. 11B the Business party identification column 1161 is the new primary key column. One paired key value is in column 1161 for each data record and one paired key value is in column 1162 for each data record. The source system identification number in column 1164 retains the original identification number information. Date of birth, social security number, and person name are shown in columns 1165, 1166, and 1167 and are carried over from the data in FIG. 11A. The workflow status in column 1168 indicates whether each data record in enterprise person table 1150 is a "duplicate", a "merge", or an "active" record. In this case only the reference data is extracted, transported and integrated. The non-reference data may remain in the original database.

FIG. 12 shows a database 1200 and database 1200a which represents the tables of FIG. 11A after a method in accordance with the present invention is applied. FIG. 12 shows tables 1210 and 1220. Table 1210 is comprised of data records 1211, 1212, and 1213 and data columns 1231, 1232, 1233 and 1234. Table 1220 is comprised of data records 1221, 1222, and 1223 and data columns 1241, 1242, 1243, 1244, and 1245. The table 1210 differs from 1110 of FIG. 11A in that the data column 1232 has been added. The other columns 1231, 1233, and 1234 in table 1210 have a counterpart in table 1110. The data column 1232 has an enterprise business party identification number which is inherited from the primary key column 1161 for the table in FIG. 11B. The table 1220 differs from 1120 of FIG. 11A in that the data column 1242 has been added. The other columns 1241, 1243, 1244, and 1245 in table 1220 have a counterpart in table 1120. The data column 1242 has an enterprise business party identification number which is inherited from the primary key column 1161 for the table 1190 in FIG. 11B.

Figure 15:
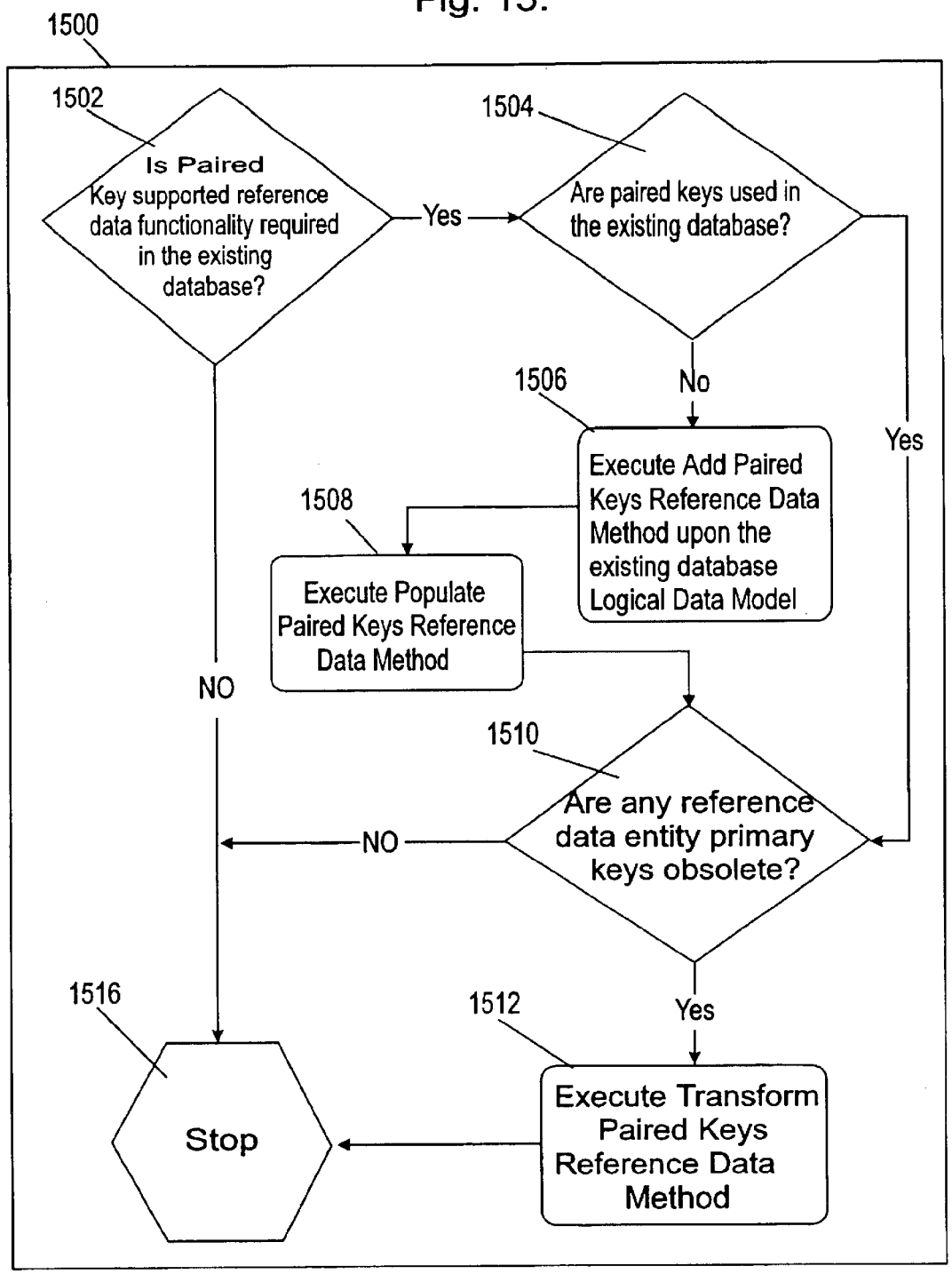
FIG. 15 shows a flow chart for adding and maintaining paired keys to reference database tables.

FIG. 15 shows a flow chart 1500 for data transformation of reference data in accordance with the present invention. At step 1502 a processor or user determines whether "paired keys" are required for this existing database. If paired keys are not required the method stops at step 1516. If paired keys are required, the processor next checks at step 1504 if paired keys are already being used. If paired keys are not yet being used, paired keys are added to the reference data of the database at step 1506. At step 1508, the populate paired keys reference data method is executed. While the add paired keys data method is used to change the structure of the database tables, the populate paired keys data method is used to add paired keys data into the new database table. At step 1510 the processor determines whether any primary keys are obsolete. If not then the procedure stops at step 1516. If so, then the procedures "Transform paired keys reference data method" at step 1512. The transform paired keys data method removes the current primary key column(s) from the reference data tables and replaces the primary key with the "Original Business Party ID" alternate key column. This is done because the original primary key values have become obsolete (no longer unique).

If paired keys are already being used at step 1504 the next step is step 1510 and the method proceeds as previously described.

Figure 16:
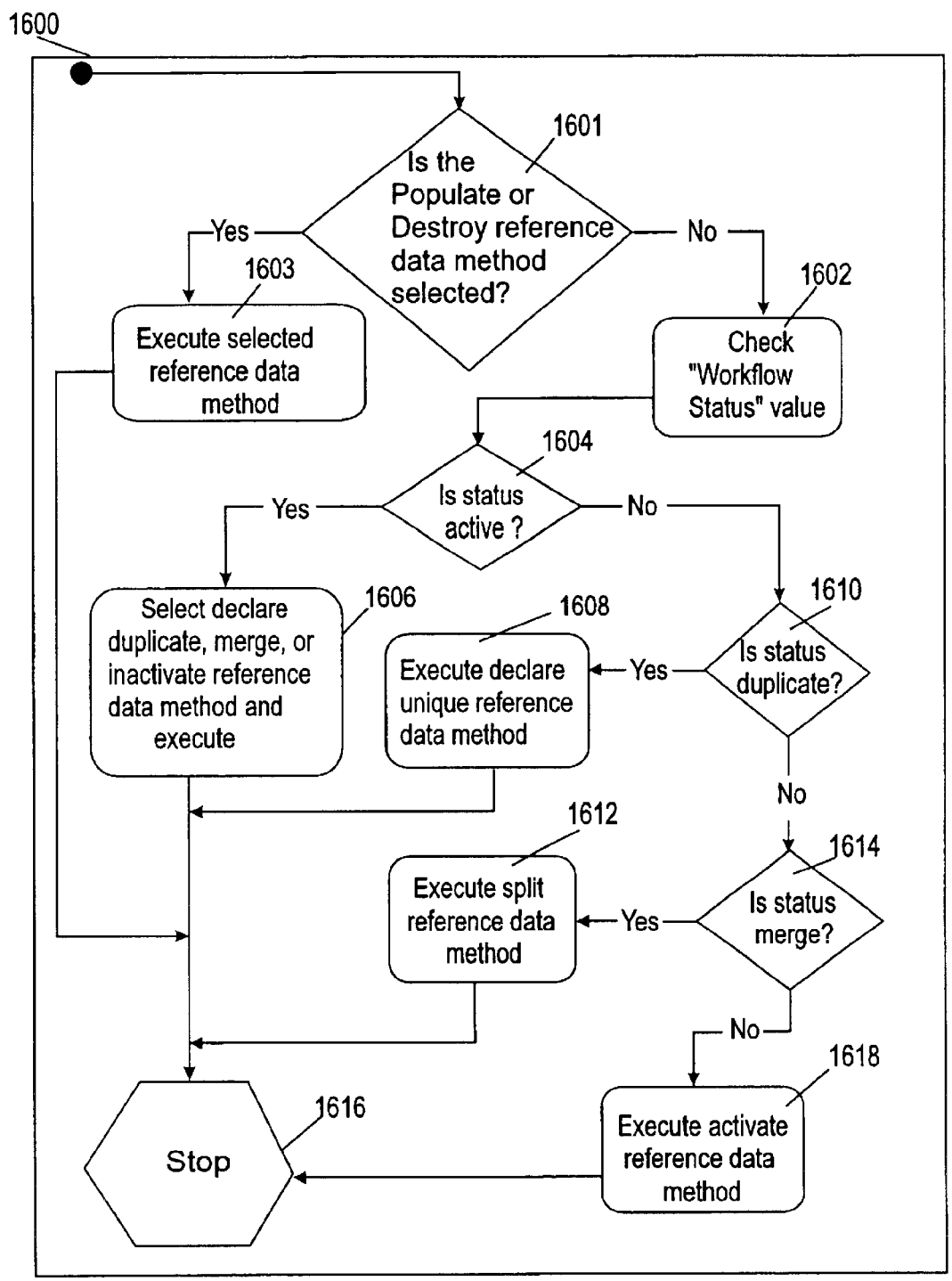
FIG. 16 shows a workflow control flow chart for the reference data methods.

FIG. 16 shows a flow chart 1600 for the control of reference data methods. Assuming a user or a processor wants to execute a new reference data method, the procedure in FIG. 16 is used in most embodiments. At step 1601 the processor checks to see if the populate or destroy reference data method has been selected. If yes, then at step 1603 the selected data reference method is executed. The procedure then stops at step 1616. If no, then at step 1602 the value of the "workflow status" (such as workflow status in column 454 of table 420) is checked. If the value is "active" at step 1604 then one of the reference data methods at step 1606 can be executed. The different reference data methods shown below will be described.

a. Declare duplicate data records.
b. Merge data records.
c. Inactivate data records.

The procedure would thereafter stop at step 1616.

If the status is not active, then it is determined if the status is "duplicate" at step 1610. If the status is "duplicate" then declare unique reference data method is executed at step 1608 and the procedure thereafter ends at step 1616. Else if the status is "merge", as determined at step 1614 then the split reference data method is executed at step 1612 and the procedure ends at step 1616. If the status is not "merge" at step 1614 then the activate reference data method is executed at step 1618 and ends at step 1616.

Figure 17:
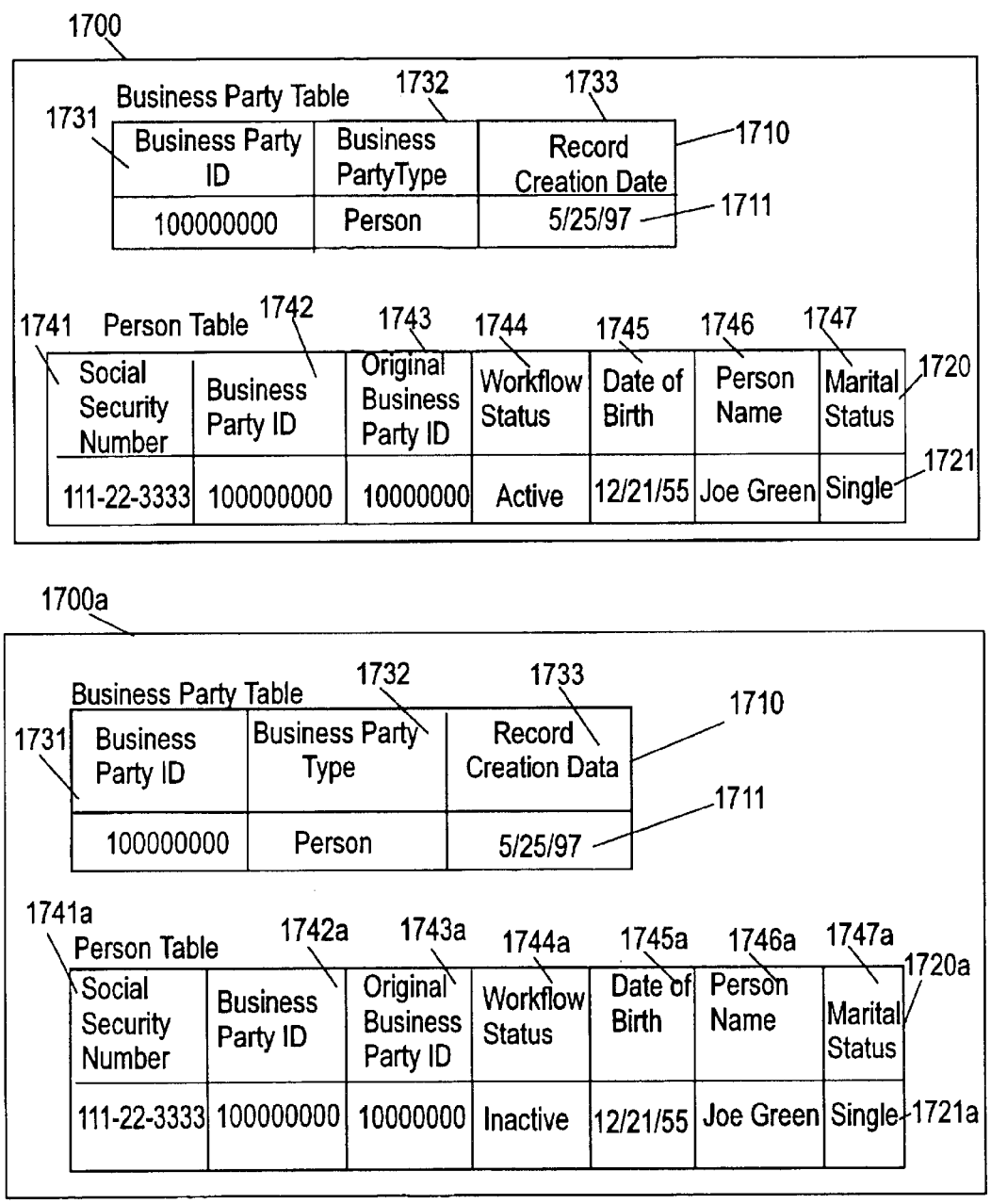
FIG. 17 shows before and after database values for the inactivate reference data method.

FIG. 17 shows database 1700 which is comprised of business party table 1710 and person table 1720 before an inactivate reference data method and database 1700a (1700 modified) which is comprised of business party table 1710 and person table 1720a after an inactivate reference data method.

Business party table 1710 includes a data record 1711 which is comprised of data columns 1731, 1732, and 1733.

Person table 1720 includes a data record 1721 which is comprised of data columns 1741, 1742, 1743, 1744, 1745, 1746, and 1747. Person table 1720*a* includes a data record 1721*a* which is comprised of data columns 1741*a*, 1742*a*, 1743*a*, 1744*a*, 1745*a*, 1746*a*, and 1747*a*.

The business party table 1710 does not change after an inactivate reference data method. The person table changes from table 1720 where the value for the workflow status in column 1744 is "Active" to the table 1720*a* where the value for the workflow status in column 1744*a* is "inactive".

In one embodiment only the inactivate reference data method can set the "workflow status" to inactive and only the activate reference data method can reverse the process. In one embodiment the "inactivate/activate" reference data methods are an infinitely reversible pair meaning that this process of inactivating and activating can be done again and again with no ill effects on the data.

FIG. 18 shows database 1800 which is comprised of business party table 1810 and person table 1820 before an activate reference data method and database 1800*a* (1800 modified) which is comprised of business party table 1810 and person table 1820*a* after an activate reference data method. The business party table 1810 is the same as the table 1710 in FIG. 17.

Business party table 1810 includes a data record 1811 which is comprised of data columns 1831, 1832, and 1833. Person table 1820 includes a data record 1821 which is comprised of data columns 1841, 1842, 1843, 1844, 1845, 1846, and 1847. Person table 1820*a* includes a data record 1821*a* which is comprised of data columns 1841*a*, 1842*a*, 1843*a*, 1844*a*, 1845*a*, 1846*a*, and 1847*a*.

The business party table 1810 does not change after an activate reference data method. The person table changes from table 1820 where the value for the workflow status in column 1844 is "inactive" to the table 1820*a* where the value for the workflow status in column 1844*a* is "active".

The following is a description of the Inactivate/Activate Reference Data Method Pair. All reference data records have a "Workflow Status" column value of "Active" when the record is newly created. "However" there are several reference data methods that cause the "Workflow Status" value to change. The inactivate reference data method is one of these data methods. When the data method is executed, the value of the "Workflow Status" is now set to "Inactive". In one embodiment, only the inactivate reference data method may set the "Workflow Status" value to "Inactive" and only the activate reference data method can reverse the process. In one embodiment, the Inactivate/Active reference data methods are an infinitely reversible pair.

The inactivate reference data method can be used to mark a reference data record as no longer pertinent. For example, if a company goes out of business, you may choose to inactivate its reference data record (such as reference data record 1721 in FIG. 17). Now, we can simply indicate that the data record is "Inactive". That is not to physically delete the reference data record, but to logically delete it by marking the data record as an "inactive" definition. The reason we logically delete the reference data record is that there is still pertinent non-reference data associated to this data record (such as transaction records previously discussed with reference to previous Figures). The following steps are performed by a processor or a user for the inactivate method.

1. Check the "Workflow Status" value (example in column 1744) in the person table to be certain it is "Active" for the data record (example record 1721 in FIG. 17) you selected to inactivate. If this is not the case, you must abort the data method.

2. Update the person table (example 1720 in FIG. 17) "Workflow Status" column (example 1744) value to "Inactive" for example for data record 1721*a*.

3. Perform a database commit. The results for this example are shown in table 1720*a* of FIG. 17.

The activate reference data method is used if the reference data record is still pertinent but at some point in time were designated as "Inactive". This reference data method is used to reverse the inactivation of a reference data definition. The following steps are performed by a processor or a user for the activate reference data method.

1. Check the "Workflow Status" value (example in column 1844) in the person table (example 1820) to be certain it is "Inactive" for the data record you selected to activate. If this is not the case, you must abort the data method.

2. Update the "Workflow Status" column's (example in column 1844) value to "Active" for the selected data record in the person table (such as 1820).

3. Perform a database commit. The results for example may be as shown in table 1820*a* of FIG. 18.

Figure 19:
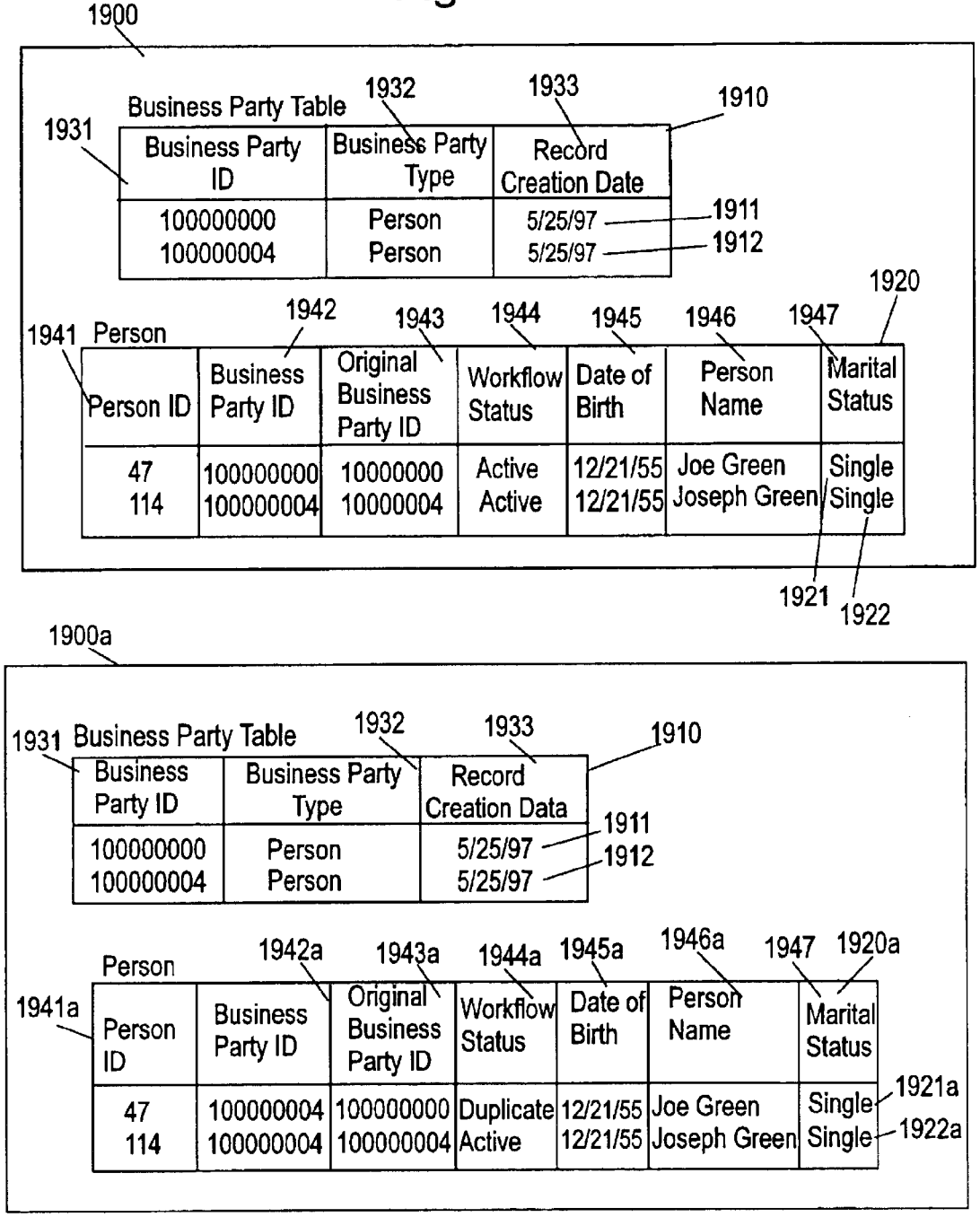
FIG. 19 shows before and after database values for the declare duplicate reference data method.

FIG. 19 shows database 1900 which is comprised of business party table 1910 and person table 1920 before a declare duplicate reference data method is executed and database 1900*a* which is comprised of business party table 1910 and person table 1920*a* after a declare duplicate reference data method is executed.

Business party table 1910 includes data records 1911 and 1912 which are each comprised of data columns 1931, 1932, and 1933. Person table 1920 includes data records 1921 and 1922 which are each comprised of data columns 1941, 1942, 1943, 1944, 1945, 1946, and 1947. Person table 1920*a* includes a data record 1921*a* and a data record 1922*a* which are comprised of data columns 1941*a*, 1942*a*, 1943*a*, 1944*a*, 1945*a*, 1946*a*, and 1947*a*.

The business party table 1910 does not change during the execution of the declare duplicate reference data method. The person table changes from table 1920 where data record 1921 has the value for the business party identification in column 1942 of "100000000" and the value for the workflow status is "Active" to the table 1920*a* where data record 1921*a* has the value in column 1942*a* of "100000004" and the workflow status in column 1944*a* is "duplicate".

FIG. 20 shows a database 2000 which is comprised of business party table 2010 and person table 2020 before a declare unique reference data method is executed and a database 2000*a* (2000 modified) which is comprised of business party table 2010 and person table 2020*a* after a declare unique reference data method is executed.

Business party table 2010 is the same as table 1910 of FIG. 19. Person table 2020 is the same as table 1920*a* of FIG. 19. Person table 2020*a* is the same as table 1920 of FIG. 19.

The business party table 2010 does not change during the execution of the declare unique reference data method. The person table 2020 where data record 2021 has the value for the business party identification in column 2042 of "100000004" and the value for the workflow status is "duplicate" to the table 2020*a* where data record 2021*a* has the value in column 2042*a* of "100000000" and the workflow status in column 1944*a* is "active".

The Declare Duplicate/Unique Reference Data Method Pair will now be described. When redundant reference data is located in the database, it needs to be "removed" because it violates the rules of reference data commonality. ("One instance of reference data" is represented by only "one reference data record"). The declare duplicate reference data method involves two or more reference data records. As shown in FIG. 19, records 1921 and 1922 will be declared duplicate. One of these data records must be selected as the complete and accurate record (in FIG. 19, record 1922) and will remain as the "Active" data record while the other synonymous data records (in FIG. 19, record 1921 changed to record 1921a) will be declared as an inactive duplicate. If none of the data records is complete and accurate you need to use the merge reference data method instead of the declare duplicate reference data method.

The declare duplicate and declare unique reference data methods are an infinitely reversible pair of reference data methods. If all the data records that are duplicates have "Workflow Status" values that are "Active" and a complete and accurate data record is found, then declare duplicate reference data method may be executed. On the other hand, in one embodiment only reference data records with "Workflow Status" values of "Duplicate" may have the declare unique reference data method executed against them.

If more than one reference data record is used to define the same instance of reference data (such as records 1921 and 1922 in FIG. 19), these data records may be considered synonyms of each other. We can therefore use the paired keys to declare these reference data records as duplicates. The declare duplicate reference data method is used to "logically remove" redundant reference data definitions from the database. That is, the data record still exists in the active database but only as an inactive data record. The following steps are followed by a processor or a user for the declare duplicate method:

1. Determine that the Person table's (for example for table 1920) "Workflow Status" column (in column 1944 for example) value is "Active" for the data record (for example record 1921) you selected to declare as a duplicate reference data record. If this is not the case, abort the data method. You can only declare a reference data record as a duplicate if its "Workflow Status" value is "Active".

2. Determine that the Person table's (for example for table 1920) "Workflow Status" column (for example for column 1944) value is "Active" for the reference data record you select as the active synonymous reference data record. (for example data record 1922). If this is not the case, abort the data method. You can not declare a synonymous reference data record a duplicate of a data record that is not "Active". If this reference data record is "Active", it will remain "Active" and is not updated by this reference data method.

3. Determine that no other reference data record is using the selected duplicate data record. The "Business Party ID" (such as in column 1942) value for the selected data record (for example record 1921) needs to be unique in the person table (such as table 1920). If this value is not unique, abort the data method. We can not change the "Workflow Status" value of a data record that is used as the "Active" data record by another reference data record.

4. Update the "Workflow Status" value (for example in column 1944) to "Duplicate" for the reference data record (for example record 1921) in the Person table (for example for table 1920) you selected to declare as the duplicate data record. Also, update the "Business Party ID" value (for example in column 1942) in the Person table (such as table 1920) to equal the value of the "Business Party ID" (such as in column 1942) of the active synonymous reference data record (such as record 1922). Now the duplicate reference data record is "linked" with its associated active synonymous reference data record.

5. Perform a database commit. An example of the results would be table 1920a.

From the non-reference point of view, we continue to associate the non-reference data records with their appropriate reference data record. After all, we may need to reverse the declare duplicate reference data method. In order to successfully reverse this reference data method we need to also know which associated non-reference data should be associated to which reference data record.

Declare Unique Reference Data Records will now be described. (With reference to FIG. 20) If we determine that we declared as duplicates two reference data records that were indeed two distinct instances of reference data, we need to reverse the actions of the declare duplicate reference data method. We can use the declare unique reference data method to declare these reference data records as the individual data records that they once were. The following steps can be performed by a processor or a user for a declare unique data method:

1. Check to be certain that the Person table (such as table 2020) data record (such as record 2021) you selected to declare unique has a "Workflow Status" column (such as column 2044) value of "Duplicate". If it does not have that value, abort the data method.

2. Update the "Workflow Status" column's (such as in 2044) value to "Active" and set the "Business Party ID" column's value (such as in column 2042) equal to the value of the "Original Business Party ID" column (such as column 2043) for the selected reference data record (such as record 2021) in the Person table (such as table 2020) you wish to reverse.

3. Perform a database commit. The results may be as shown in column 2020a.

We continued to associate the non-reference data records with their appropriate reference data record after the duplicates were declared. Therefore when we reverse the declare duplicate data method, the associated non-reference data records are still related to the proper reference data record.

FIG. 21 shows a database 2100 which is comprised of business party table 2110 and a company table 2120 before a merge reference data method and a database 2100a (2100 modified) comprised of business party table 2110 and company table 2120a after a merge reference data method.

Business party table 2110 includes data records 2111, 2112, and 2113 which are each comprised of data columns 2131, 2132, and 2133. Company table 2120 includes data records 2121, 2122, and 2123 which are each comprised of data columns 2141, 2142, 2143, 2144, 2145, and 2146. Company table 2120a includes a data records 2121a, 2122a, and 2123a each of which is comprised of data columns 2141a, 2142a, 2143a, 2144a, 2145a, and 2146a.

The business party table 2110 does not change after the merge reference data method has been executed. The company table changes from table 2120 to table 2120a as follows. The values in records 2121 and 2222 for business party identification in column 2142 are changed from "10" and "20" in table 2120 to "30" and "30" in table 2120a. The values in records 2121 and 2122 for workflow status in column 2144 are changed from "Active" and "Active" in table 2120 to "Merge" and "Merge" in table 2120a. Any associated or linked non-reference tables are not affected.

FIG. 22 shows database 2200 which is comprised of business party table 2210 and company table 2220 before a execution of a split reference data method and a database 2200a (2200 modified) which is comprised of business party table 2210 and company table 2220a after the execution of a split reference data method.

Business party table 2210 is the same as table 2110 of FIG. 21. Table 2220 is the same as table 2120a of FIG. 21. Table 2220a is the same as table 2120 of FIG. 22. Essentially the split reference data method undoes what the merge reference data method of FIG. 21 does. The merge reference data method is used to merge two or more reference data records (such as records 2121 and 2122 in FIG. 21) into a new single reference data record (such as the record 2123a in FIG. 21). The split reference data method (FIG. 22) is used to reverse the merge reference data method. In order to support the merge/split reference data method pair we need to capture the fact that a merge has occurred and maintain the pre-merge and post merger view of our reference data. If we do not retain the pre-merge view of reference data, we will be unable to support the split reference data method. The merge reference data method may be used to:

1. Merge multiple data records into a single data record to reflect an actual merge of reference data instances.

2. Merge two or more partial reference data records into a single complete and accurate reference data record.

An example of a data record merge (FIG. 21) would be the merger between company "AAA in record 2121 and company "ZZZ" (record 2122). In this case these two formerly separate corporations are merged into a single new corporation "AAA-ZZZ" (shown in 2123). We still want our pre-merge data to reflect the historically correct data view that these corporations existed as separate corporate entities.

We also merge data to form a consolidated reference data record from two or more incomplete reference data records. The merge reference data method is used if data records have contrary values or if data records from difference source systems contain difference subsets of reference data attributes. From these inconsistent or incomplete reference data records we merge the reference data into a more complete and accurate reference data record. In this case, we usually continue to associate non-reference data with the original reference data records especially if they originate in different source systems.

The merge reference data method shown in FIG. 21 is used to combine two or more reference data records into a single reference data record. For this reference data method, we will assume that the new data record 2123 in FIG. 21 representing the active merged data record has already been created. This record is created using the create reference data method. The following steps are performed by a processor or a user to execute the merge reference data method:

1. Verify that the Company table's (such as table 2120), "Workflow Status" column (such as column 2144) values are "Active" for the data records, (such as records 2121 and 2122) that you selected to merge. If this is not the case, abort the data method. You can only merge reference data records if their "Workflow Status" column value is "Active".

2. Determine that no other reference data record is using the selected reference data record (such as records 2121 and 2122) to be updated by this the merge reference data method. The "Business Party ID" column's value (such as shown in Column 2142, "10" for record 2121 and "20" for record 2122) for the selected data record in the company table (such as table 2120) needs to be unique in that column. If this value is not unique, abort the reference data method because some other data record is referencing the record you are attempting to modify. Reverse the offending reference data record(s) before trying the merge reference data method again. Update the "Workflow Status" value (such as in column 2144) to "Merge" for the reference data record in the company table you wish to mark as the merged reference data record. (Such as records 2121 and 2122). Update the "Business Party ID" column's value in column 2142 in the company table 2120 to equal the value of the active merged reference data record's (such as record 2123) "Business Party ID" column (such as column 2142, value "30"). Perform a database commit to store the changes in permanent memory.

3. Go to step #2 of this reference data method for any other reference data records that need to be merged into the same new reference data record.

The split reference data method (FIG. 22) is used to reverse the merge reference data method. With this split reference data method, the non-reference data associated with any of the reference data records to be split, will remain with those reference data records. In other words, we do not reassign non-reference data records as part of this reference data method. This completely reverses the merge reference data method. Only non-reference data that has been associated with the new post-merge merged reference data record 2223a will remain with that reference data record and will not be reassigned as part of this reference data method. The following steps would be executed by a processor or a user to perform the split reference data method.

1. Determine if the "Workflow Status" column's (column 2244) value is "Merge" for that data record (data records 2221 and 2222) you selected to split in the company table (such as table 2220). If this is not the case, abort the data method. You can only split a reference data record if its "Workflow Status" column's (such as in column 2244) value is "Merge".

2. Update the "Workflow Status" column's value (such as in column 2244) to "Active" and update the "Business Party ID" column's value (in column 2242) to equal the value of the "Original Business Party ID" column 2243 for the reference data record (records 2221 and 2222) in the company table (such as table 2220) you wish to split from the previously merged reference data record.

3. Perform a database commit to store the changes in permanent memory (such as memory 702 in FIG. 7). An example of the results would be table 2220a.

Repeat the data method for any other reference data records that need to be split from the same merged reference data record.

FIG. 23 shows a database 2300 comprised of business party table 2310 and person table 2320 before an integrate reference data method and a database 2300a (2300 modified) comprised of business party table 2310a and person table 2320a after an integrate reference data method.

Business party table 2310 includes data columns 2331, 2332, 2333, 2334, and 2335. Person table 2320 includes data columns 2341, 2342, 2343, 2344, 2345, and 2346. All of these data columns are empty and the tables 2310 and 2320 contain no data in this example.

Business party table 2310a includes data columns 2331a, 2332a, 2333a, 2334a, and 2335a. Person table 2320a includes data columns 2341a, 2342a, 2344a, 2344a, 2345a, and 2346a. Each of these columns now contains data. The data that is used to populate these tables is shown in FIG. 10A. The method used to populate these tables is shown in the flow chart of FIG. 25. Each data record is copied from source databases (FIG. 10A) into the new tables 2310 and 2320) using the create reference data record. After all the data records have been created, the merge and declare duplicate reference data method may then be executed to integrate and clean the reference data.

FIG. 24 shows a database 2400 which is comprised of a business party table 2410 and person table 2420 before an isolate reference data method is executed, and a database 2400a (2400 modified) which is comprised of a business party table 2410a and person table 2420a after an isolate reference data method is executed. Basically the isolate reference data method undoes the integrate reference data method. Tables 2410 in FIG. 24 is the same as table 2310a in FIG. 23. Table 2420 is the same as table 2320a in FIG. 23.

Tables 2410*a* and 2420*a* in FIG. 24 are the same as tables 2310 and 2320, respectively, in FIG. 23.

The integration reference data method and the isolation reference data method form a reversible pair of reference data methods. In addition, these reference data methods are a composite of other reference data methods. The Integration/Isolation reference data methods are comprised of:

1. The create/delete reference data methods
2. The declare duplicate/declare unique reference data methods
3. The merge/split reference data methods We will provide a flow chart shown in FIG. 25 and description to detail how to utilize these composite data methods. Since we are supporting data integration as a reversible process, we need to maintain a link between our identification of unique reference data and the source system's identification (2333 and 2332) of unique reference data. Maintaining this link is also important for updating data records based upon changes in the source system. In addition, we may derive data in our paired key identified data structures that need to be recorded back in a source system. In both cases, we need to maintain the link between the source systems and the integrated system.

In order to maintain the link between the source system and the integrated data structures, we need to record the primary key and the source system from which the reference data was attained. Depending upon the source system you may need to keep other information as well such as the table name.

Figure 25:
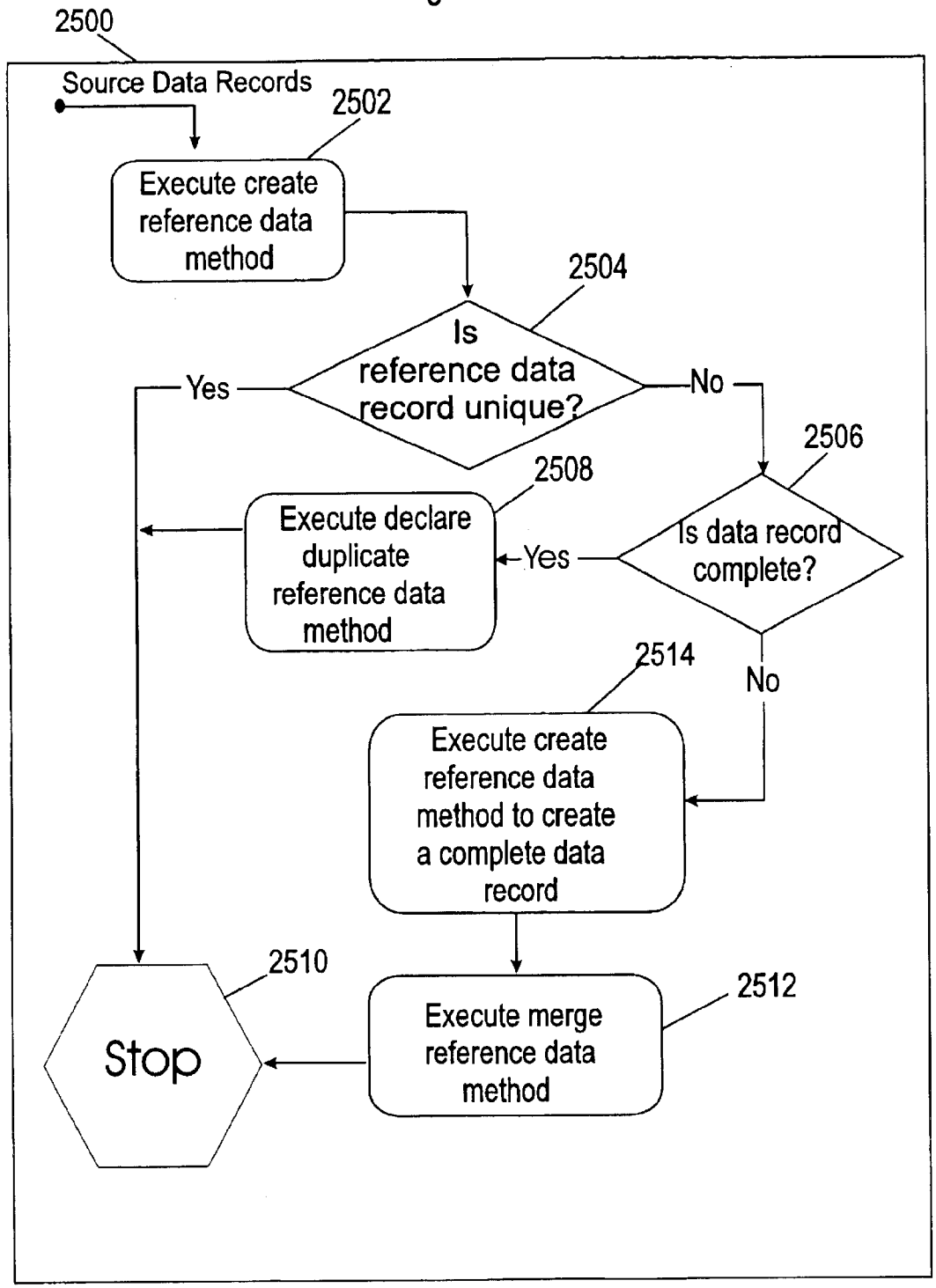
FIG. 25 shows a flow chart of the operation of the integrate reference data method.

The integrate reference data method is comprised of the create reference data method, the declare duplicate reference data method, and the merge reference data method. A flow chart 2500 depicting the composite integrate reference data method is shown in FIG. 25. At step 2502 the create reference data method is executed. The step 2502 acts on source data records received as shown in FIG. 25. At step 2504 the processor or user determines if the reference data record is unique. If so, then the procedure stops at step 2510. If not, the next step 2506 determines if the data record is complete. If the answer is no, the create reference data method is performed at step 2514 to create a complete data record, and next the merge reference data method is performed at step 2512 and the procedure stops at step 2510. If the answer is yes the declare duplicate data method is performed at step 2508 and then the procedure ends at step 2510. The step 2514 along with the other steps of FIG. 25 creates a complete and accurate reference data record into which incomplete and/or inaccurate reference data records may be merged via the merge reference data method.

The integrate reference data method must first execute the create reference data method (at step 2502) in order to bring the data records from the source systems to the integrated data structure. Of course some source system data may need to undergo a few simple data transformations if the integrated system's data structure is significantly different from the source system's data structure. When a data record has been created, we need to determine if the data record is unique or not (at step 2504). This determination may be made as each data record is created, but it is possibly better to wait until a complete batch of data records have been created. With paired keys, you can declare duplicates' or merge your reference data anytime you feel it is appropriate.

If a data record is unique no further work is required (step 2510). If the data record is not unique, you need to determine if the declare duplicate or the merge reference data method would be best. If one of the duplicate reference data records is complete and accurate, use the declare duplicate reference data method (step 2508). If no single data record reflects a complete and accurate representation of the reference data, then use step 2514 followed by the merge reference data method step 2512.

In FIG. 10A we illustrate customer related reference data from two source systems. The first table is from source system "A" and the second table is from source system "B". Please notice that both source system tables have common attributes that allow us to integrate the data from both data contexts into an integrated data structure. It is obvious from the social security Number (1033 and 1043) values that two data records from each table represent the same person.

After the integration data method has executed, the last two tables (FIG. 23, 2310*a* and 2320*a*) are populated with reference data. With the paired keys data integration approach, we bring into the paired key identified tables as though they were individual data records. Data records 1011, 1012, 1013, 1021, 1022, and 1023 in FIG. 10A became 2327*a*, 2321*a*, 2322*a*, 2323*a*, 2324*a* and 2325*a* respectively in FIG. 23. After the data records are created, the integration process may continue by executing the merge or the declare duplicate reference data methods to achieve data integration.

It is also important to this reference data method that the paired key defining table 2310 be set up to uniquely identify every reference data record being entered. Therefore, we need to place a unique index upon the combined "Source System Code" (2332) and "Source System's ID" (2333) attributes so that we do not inadvertently create redundant reference data records. These two columns combine to form a composite alternate key.

In this example (FIG. 23, table 2320*a*), it appears that J. Green and Mrs. Jane Green is the same customer based upon the social security number recorded in both source systems. (1033 and 1043) Since one of the source data records (1021) appears to be complete and accurate, we execute the declare duplicate reference data method resulting in record 2321*a*. J. J. Jones (in record 1023) and Dr. Jack J. Jones (in record 1013) also appear to be duplicate reference data records. In this case, no one data record is complete. Therefore we execute the merge reference data method. This data method creates a single complete data record (2326*a*) while setting the "Workflow Status" (in 2346*a*) value of the contributing data records (2322*a* and 2325*a*) to "Merge".

Figure 26:
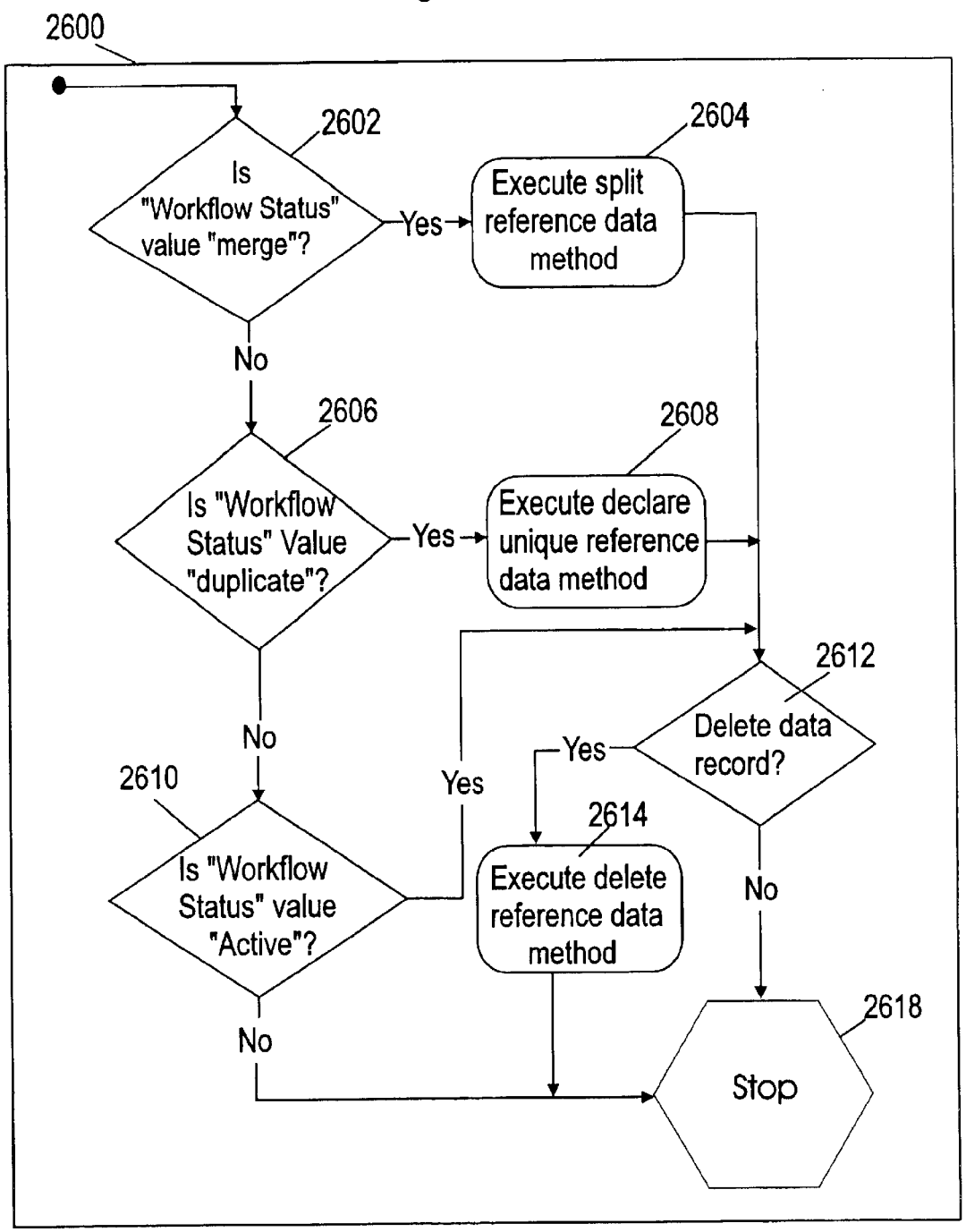
FIG. 26 shows a flow chart of the operation of the isolate reference data method.

The isolate reference data method is also a composite reference data method as shown in FIG. 24. In this case the split or declare unique reference data methods must be run first. Once completed, the delete reference data method is executed to remove unneeded data records. FIG. 26 illustrates the flow chart 2600 for this composite reference data method. At step 2602 the processor determines if the "workflow status" (in column 2446) value is "merge" (for example data records 2422*a* and 2425*a*). If so, the split reference data method is performed at step 2604. The processor determines if the data record may be deleted at step 2612 and if so the delete reference data record method is performed at step 2614 and the procedure would end at step 2616.

If the workflow status in column 2446 for record 2421*a* is "duplicate "(at step 2606) then the declare unique reference data method is performed at step 2608. The processor again determines whether the data record may be deleted at step 2612 and performs the delete reference data method at step 2614 if necessary. If the workflow status in column 2446 is "active" (for data records 2423*a*, 2424*a*, 2426*a* and 2427*a*) the processor again determines whether the data record may be deleted at step 2612 and performs this step if necessary at step 2614. If the workflow status is none of the above ("inactive" or other) then the procedure stops at step 2616. A data record may be deleted provided no non-reference data records are associated to it (i.e. no non-reference data records inherit its primary key value). To determine which data records result from the integration reference data method, the processor or user checks the value of the "Source System Code" (2432) column of the business party table (2410). For each of the appropriate data records, the "Workflow Status" value (2446) is used to discriminate which reference data method is run first. If the "Workflow Status" value (2446) is "Merge", or "Duplicate", you execute the split reference data method or the declare unique reference data method respectively. Once you have reversed these data methods the "Workflow Status" value (in column 2446) will equal "Active". The processor or user may now execute the delete reference data method to delete any reference data records that have no non-reference data records associated with them.

The isolation reference data method is the reverse of the integration reference data method. It is important to have a reverse method for the integrate reference data method because we may need to reverse the integration reference data method if a mistake was made for example.

After the isolation data method has been executed, all the reference data records have been removed from the last two tables as shown in FIG. 24. All data records created as a result of executing the integration reference data methods were removed. Since the isolation reference data method is a composite reference data method, the data record removal is accomplished in multiple steps. First the appropriate selected reference data records needed to be reversed to set their "Workflow Status" value (2446) to "Active". Then, these reference data records needed to be removed by using the delete reference data method.

Figure 27:
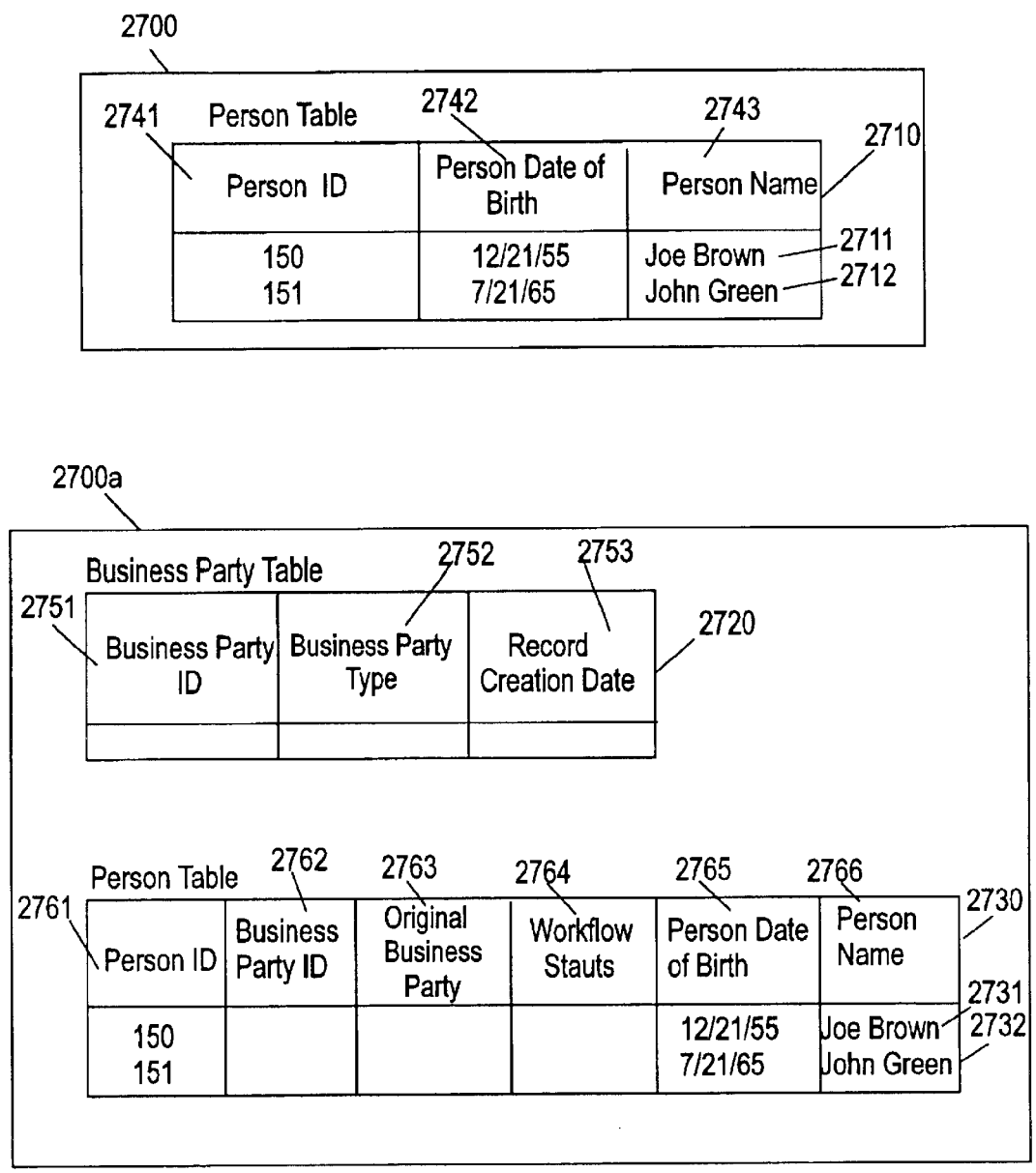
FIG. 27 shows before and after database values for the add paired keys reference data method.

FIG. 27 shows a database 2700 comprised of a person table 2710 before executing the add paired keys reference data method and a database 2700a (2700 modified) which is comprised of a business party table 2720 and a person table 2730 after executing the add the paired keys reference data method. The person table 2710 includes data records 2711 and 2712. Each data record includes data under data columns 2741, 2742, and 2743.

The paired keys technique in this embodiment includes adding the business party table which previously did not exist. The add paired keys reference data method is used to modify the table structure. It is most often used with the populate paired keys reference data method which places data into the new table and added columns. The business party table 2720 currently does not have any data. However if any data records are added to it, they can include data under data columns 2751, 2752, and 2753. The person table 2730 is more expanded than the person table 2710. The person table 2730 includes data column 2761, 2762, 2763, 2764, 2765, and 2766. The data columns 2761, 2765, and 2766 have similar data columns and data in table 2710 however the data columns 2762, 2763, and 2764 are new. Currently there is no data in these columns however data to be placed in these columns provides the paired keys technique.

FIG. 28 shows a database 2800 comprised of the various tables before and shows a database 2800a after executing a remove paired keys reference data method. Before removing paired keys the business party table 2720 and the person table 2730 are as shown in FIG. 28 and in FIG. 27. After removing paired keys the business party table 2720 no longer exists and the person table is reduced to table 2710 shown in FIGS. 27 and 28.

The add/remove paired keys reference data methods are part of the transformation reference data function. In essence, we are transforming the primary key values of the existing reference data without actually impacting the existing key values. That is, we are providing the ability to assign new reference data to an existing data context. Again, this new reference data may be contained in the current database table, in another database table or in another table in a separate database.

Paired keys are added to existing data structures to enhance the functionality of the data structures. On the other hand, paired keys may be removed from data structures if the functionality is no longer required in that data structure.

The add/remove paired keys reference data method cycle has no equivalent data methods in the prior art paradigm. In fact the lack of this ability to upgrade the reference data in prior art data administration is one reason that we need to do so many data transformations. With the prior art, we have no way of adding required reference data functionality to already existing data structures.

The add/remove paired keys reference data methods are designed in most (if not all) embodiments to be infinitely reversible. Therefore, we require no data transformations for this reference data function. This is one of the great advantages of using the paired keys over the prior art data design methodologies. The ability to support this cycle is the result of the total isolation we provide between the reference data and the non-reference or related data. The addition of paired keys to reference data entities is the same for any structure. The general procedure for adding paired keys to an existing data structure is as follows:

1. Add the paired key-defining table (Business Party table—such as table 2720) if it does not already exist.

2. Add the original paired key column (original business party identification 2763) to the reference table (2730) of interest.

3. Add the Paired Key Column ("Business Party ID" 2762) to the reference table (2730) of interest.

4. Add the "Workflow Status" column (2764) to the reference table of interest.

5. Perform a database commit to store the changes in permanent memory.

This reference data method should be used as a guideline to adding paired keys to already existing reference data tables. The most important objectives for this reference data method are:

To assure that the "Original Business Party ID" in column 2763 is uniquely defined in this table 2730. To assure that the already existing primary key attribute(s) "person ID" value in column 2761 of the selected reference data table 2730 is permanently associated with the one and only one "Original Business Party ID Value" in column 2763. To provide the paired key "Business Party ID" in column 2762 attribute which now is used to associate non-reference data to new reference data as required. To provide the mandatory "workflow Status" in column 2764 that allows for controlling changes to the reference data record.

The removal of paired keys from reference data tables is the same for logical data structure. There may be several reasons for removing paired keys. For example, the paired keys were added to a table by mistake or the reference data functions supported by the paired keys are no longer required. The general process for removing paired keys from an existing data structure is as follows:

1. Delete the "original paired key column" (such as "original business party ID" column 2763), and the "paired key column" ("Business Party ID" column 2762) and the "Workflow Status" column (2764) from the reference data table (2730) of interest.

2. Delete the paired key-defining table (Business Party table—such as 2720) if it is empty and contains no data records.

3. Perform a database commit to store the changes in permanent memory such as memory 702 in FIG. 7.

FIG. 29 shows database 2900 which is comprised of a business party table 2910 and a table 2920 as they exist prior to the reference data method of transforming the paired keys. FIG. 29 also shows database 2900a (2900 modified) comprised of table 2910 and table 2920a as they exist after the reference data method of transforming the paired keys. The business party table 2910 is not affected by the method. The person table 2920a and the person table 2920 differ in that the primary key column of those tables is now different. The transform reference data method removes the primary key column (person identification) and replaces it with the alternate key column (original business party identification). The original business party identification is the new primary key column for this table. The order of the columns is unimportant. However, by convention, the primary key columns are listed first.

In person table 2920 the primary key column is person identification number (in column 2921). In person table 2920a the original business party identification column 2923 is now the primary key column for the table 2920a.

FIG. 30 shows database 3000 which is comprised of the same tables for the interpret paired keys reference data method. This data method undoes the transform paired keys reference data method. In this method we start out with tables 2910 and 2920a. Table 2910 is again unchanged and table 2920a is changed into table 2920. FIG. 30 also shows database 3000a after the change.

The transform/interpret paired keys reference data methods are part of the transformation reference data function. With prior art data administration, data structures are transformed for a variety of reasons such as: the data needs to be cleaned, the data needs to be integrated into an already existing data structure, or the current data structure has become obsolete.

A reason to transform data identified using paired keys is that the reference data primary key values in the existing database have become obsolete. With the use of paired keys, data can be cleaned and integrated in the defined data structure as long as the existing primary key values remain unique. Should the existing primary key values become obsolete, we merely replace them with the values in the alternate key column such as the original business party ID (2923 in FIG. 29).

The transformation of paired keys is the process of replacing the existing primary key column(s) (2921) with the alternate key column(s) (2923) that has been permanently associated with each existing primary key. However, not only do you need to replace the primary key column(s) of the reference data but also all inherited foreign key columns of the related data records will now change as well.

The general process for transforming the paired keys is as follows:

1. Declare the Original Business Party ID column (2923) as the person table's (2920) primary key.

2. Modify the related tables by appending an Original Business Party ID column to each related table (not shown).

3. Populate these new Original Business Party ID columns by reading the Person ID value for the selected data record for example value "151". Find the data record in the person table (2920) that contains that value "151" in the Person ID column (2921) and copy the value from the Original Business Party ID column (2923) in this example value "2", into the related table's data record being populated.

4. Commit the transaction to store the changes in permanent memory. This reference data method should be used as a guideline to transform paired keys from an already existing structure. The two most important objectives for the transform reference data method are: to replace the current primary key column(s) 2921 with the alternate key column 2923 and to assure that we can reverse or interpret the transformed key values back into their equivalent existing primary key values as needed. It is important to realize that now all the related tables will now contain the new inherited foreign key column. This is a major change to the associated database table structure. The transformation of paired keys is the process of replacing the existing primary key column (s) with the alternate key column that is permanently associated with each existing primary key as part of the paired key methods. The reverse data method for transformation of paired keys is the interpret paired key reference data method.

The general process for interpreting the paired keys is as follows (shown in FIG. 30):

1. Declare the Person ID column (291) as the person table's (2920) primary key. Since we did not delete the Person ID columns in our non-reference tables, no changes to those tables are required.

2. Commit the transaction to store the changes in permanent memory such as memory 702 of FIG. 7.

This reference data method should be used as a guideline to interpret paired keys from an already existing data structure. The two most important objectives for this reference data method are: To replace the current primary key column 2923 with the original primary key column 2921 and to assure that we can again transformed the data structure to get exactly the same result as before.

FIG. 31 shows database 3100 comprised of data tables before and database 3100a after a create reference data method. The business party table 3110 has data columns 3111, 3112, and 3113 but not actual data in this example. The person table 3120 includes data columns 3121, 3122, 3123, 3124, 3125, 3126, 3127, and 3128. None of these data columns have any data in this example. Executing the create reference data method results in tables 3110a and 3120a are shown. Table 3110a now has a record 3131a which includes data in each of the three columns 3111a, 3112a and 3113a. Table 3120a now has a record 3141a which includes data in each of the columns 3121a–3128a.

FIG. 32 shows database 3200 with respect to the operation of the delete reference data method which undoes the create reference data method. Before the delete reference data method the tables 3110a and 3120a exist. After the delete reference data method these tables are replaced (or changed into) tables 3110 and 3120 as shown in database 3200a.

This pair of reference data methods is used for creating and destroying reference data records. The create reference data method is used for initially defining reference data records. For each reference data record, a mutually exclusive identifier is permanently assigned as that data record's alternate key column 3123. These identifier values are never reused once they have been assigned.

The delete reference data method is used to remove reference data records that are no longer required. But there is a complication here. Once related data has been associated with a given reference data record, that reference data record may not be removed. If you remove the related data, the reference data record may then be deleted. With paired keys, any reference data record associated to related data may be logically deleted. The logical delete does not remove the reference data record but does mark it as "Inactive". The reference data method for performing this logical delete is the inactivate reference data method.

The create reference data method is used to add a new reference data record to the database. To create a data record in paired key identified data structures, you need to create a data record in both tables (3110*a* and 3120*a*). The general process for creating a data record is as follows (FIG. 31):

1. Attempt to determine that the reference data record does not already exist in the Business Party table 3110*a* and the person table 3120*a*. If the reference data record does exist, abort the data method.

2. Create a record in the Business Party Table 3110*a* populating the "Business Party ID" column 3110*a* with the next integer value that has not been previously assigned. Also populate the remaining attributes in the new data record as appropriate. (Business Party Type="Person", Record creation date="4-Apr. 92")

3. Create a data record in the person table 3120*a*. Populate the primary key column (such as 3121) with the appropriate value (in this case "4454" to form entry in column 3121*a*) In this example, the appropriate value is the value as determined by the existing database application. Also populate both the "Original Business Party ID" column 3123 and the "Business Party ID" column 3122 with the primary key value (which here is "100000000") used in the business party 3110*a* table column 3111*a* to form columns 3123*a* and 3122*a*. These two values are required to be the same when the data record is created. Set the "Workflow Status" (in column 2344*a*) value to "Active" in this data record.

4. Record values for the other pertinent columns in the person table 3120*a* if appropriate.

5. Commit the database transaction storing the changes in permanent memory.

Once the reference data has been successfully created, you may create related data records that are related to this reference data record. The person ID column's (see column 3121*a*) value as the inherited foreign key value utilized in the related data records.

The delete reference data method is used to: Remove reference data added by mistake, to remove reference data that has been archived, or to remove reference data that is no longer associated to non-reference data. With this reference data method, we will remove the reference data records. The related data associated to these reference data records has already been removed from the database or it never existed.

The paired keys methodology dictates that reference data should not normally be deleted from the database tables as long as data relates to it. Instead of using the delete reference data method, the inactivate reference data methods should first be considered to logically delete reference data.

In order to completely delete a paired key identified reference data record you need to remove both the business party table's data record 3110*a* and the associated person table's data record 3120*a* These data record pairs were created together and need to be deleted together. These data record pairs are easy to identify since the primary key value 3111*a* of the business party table 3110*a* will equal the original Business Party ID" value in column 3123*a* in the person table 3120*a*. The general process for deleting a data record is as follows (shown in FIG. 32):

1. Attempt to delete the selected person table's data record 3141*a*. If the delete fails, there is a data record associated to this reference data record. The related data records need to be deleted before this data record may be deleted. If the delete failed, abort the delete reference data method.

2. Attempt to delete the Business Party table's data record 3131*a* where the Business Party ID" in column 3111*a* is equal to the value of the Original Business Party ID 3123*a* you need to delete in step 1 above. If this delete fails, abort the data method and rollback the database transaction. The "Business Party ID" value in column 3111*a* is being used by the by some other person table's (such as table 3120*a*) data record and the database transaction needs to be rolled back to "undo" the delete of the person table data record (3141*a*).

3. If all the previous steps have been completed successfully, commit the database transaction to store the results in permanent memory.

FIG. 33 shows databases 3300 and 3300*a* with respect to the operation of the populate paired keys reference data method before (3300) and after (3300*a*) the reference data method is executed. Tables 3310, 3320, 3330, and 3340 exist before populating the paired key columns. Tables 3310*a*, 3320*a*, 3330*a* and 3340*a* exist after populating the paired key columns. Business party table 3310*a* now has records such as 3351*a* each of which include data in each of data columns 3311*a*, 3312*a*, and 3313*a*. Business party table 3310 had no data records in this example.

Person table 3320*a* now has data in columns 3321*a*, 3322*a*, 3323*a*, 3324*a*, 3325*a*, and. 3326*a* for records such as data record 3361*a*. Person table 3320 does not have any data in similar columns 3322, 3323, and 3324. Business organization table 3330*a* now has data in columns 3331*a*, 3332*a*, 3333*a*, 3334*a*, 3335*a*, and 3336*a* for data record 3371*a*. Business organization table 3330 before populating the paired keys, does not have data in similar data columns 3332, 3333, and 3334. Government Agency Table 3340*a* now has data in columns 3341*a*–3346*a* while table 3340 had no data in similar columns 3342, 3343, and 3344. Basically, a business party identification, an original business party identification, and a workflow status are assigned to each data record in the person table 3320*a*, the business organization table 3330*a*, and the government agency table 3340*a*.

FIG. 34 shows database 3400 with respect to the destroy paired keys reference data method which undoes the populate paired keys reference data method. Tables 3310*a*, 3320*a*, 3330*a*, and 3340*a* exist prior to the execution of this reference data method and tables 3310, 3320, 3330, and 3340 exist in database 3400*a* after this method has been executed.

After the paired keys related columns have been added to an existing database table, we need to populate the new data columns that support the use of paired keys. In this example (FIG. 33), we have already executed the "add paired keys reference data method" to create this paired key data structure. In addition, the existing data has been populated into the tables as seen in the tables 3320, 3330, and 3340. In order to populate these tables, the foreign key constrains to the business party table must not be enforced. The foreign key contraints are the business rules I addressed earlier. In this case, we are constrained in that we may not have a value in the person table's business party ID column 3322 that is not in the business party table's business party ID column 3311. The data base management system (such as computer software run by processor 706 of FIG. 7) enforces this rule.

The "Business Party ID" (such as 3322, 3332, and 3342), the "Original Business Party ID" (3323, 3333, and 3343), and the "Workflow Status" (shown in columns 3324, 3334, and 3344) attributes must be set to optional ("optional" means the data is not required.) for each table that contains these columns that are not yet populated. The general process for populating paired keys is as follows. (shown in FIG. 33).

1. Select a table that needs to be populated with "Business Party ID" values (as shown in column 3322a), "Original Business Party ID" values (shown in column 3323a), and "Workflow Status" values (shown in column 3324a).

2. Create a new data record 3351a in the Business Party table 3310 Be certain to supply values for all mandatory required columns.

3. Update the first data record, in the selected table by setting the, "Business Party ID" in column 3322a and the "Original Business Party ID" in column 3323a equal to the primary key value "1", just created in the business party table 3310a for data record 3351a. Set the "Workflow Status" value in column 3324a to "Active".

4. If there are more data records in the selected table to be updated, go to step 2. If all the records in the selected table have been updated, go to step 5.

5. Set the "Business Party ID" in column 3322a, the "Original Business Party ID" in column 3323a, and the "Workflow Status" in column 3324a columns to be mandatory (required) or "NOT NULL".

6. Reinstate the foreign key constraints between the Business Party table 3310a primary key 3311a and the "Business Party ID" column 3322a and the "Original Business Party ID" 3323a column. Also, be certain that there is a unique index on the "Original Business Party ID" column 3323a to insure that the values are unique and are not duplicated.

7. Execute a database commit. To store the data in permanent memory such as memory 702 of FIG. 7. If there are more tables that need to be populated (such as tables 3330a and 3340a), go to step 1, above. If all the tables have been completely populated, then the reference data method has completed execution.

While this data method requires a bit of work, it is nothing compared to the data transformation work that is required if you use the prior art approach for cleansing and integrating data. The important points for this data method are: Be certain that that each data record in the business party table 3310a is only referenced once by an "Originating Business Party ID" foreign key value from all the associated tables (3320a, 3330a, and 3340a). Be certain that the "Original Business party ID" column (such as 3323a, 3333a, 3343a), the "Business party ID" column (such as 3322a, 3332a, and 3342a) and the "Workflow Status" column (such as 3324a, 3334a, and 3344a) are all set as mandatory in each table they are defined. Be certain that there is a unique index on the "Originating Business Party ID" column (such as 3323a, 3333a, and 3343a). This index enforces the one-to-one relationship between this column 3323a and the table's primary key column 3321a, which is extremely important.

The destroy paired keys reference data method is used to reverse the populate paired keys reference data method. This data method may be used for correcting errors in existing paired key values or before replacing existing paired key values. Because of the total isolation between the reference and related data provided by paired keys, you may change the reference data in a database at any time. This change of reference data would require that the old reference data be removed before the new reference data is populated. Therefore, you need to execute the destroy paired keys reference data method before you again populate the paired keys attributes. The destroy paired keys method works as follows: (FIG. 34)

1. Set the paired key columns (such as columns 3322a, 3323a, and 3324a for example) to optional and commit the changes to the database. The paired key columns in any table are normally mandatory or required columns and therefore may not contain "NULL" values. We must therefore make these columns optional before we remove the values contained within.

2. Update the values of the paired key columns to "NULL" for the table (for example the person table 3320a, business organization table 3330a and the Government Agency Table 3340a) in which you selected to destroy the paired keys.

3. Delete the data records from the Business Party Table that were related to the table(s) that had their paired keys destroyed. This is a data method that makes use of the "Business Party Type" in column 3312a in the business party table 3310a. This column is used to determine for what table a data record was created.

4. Commit the database transaction to store the change in permanent memory, such as memory 702 of FIG. 7.

I claim:

1. A computer-implemented method comprising the steps of
   creating a first field for a first reference data record and placing a first identification in the first field of the first reference data record;
   creating a second field for a first reference data record and placing the first identification in the second field of the first reference data record; and
   wherein the first identification uniquely identifies the first reference data record.

2. The method of claim 1 further comprising
   creating a first field for a second reference data record and placing a second identification in the first field of the second reference data record;
   creating a second field for a second reference data record and placing the second identification in the second field of the second reference data record; and
   wherein the second identification uniquely identifies the second reference data record.

3. The method of claim 2 wherein
   the first identification is an identification number;
   and the second identification is an identification number.

4. The method of claim 2 further comprising
   determining that the first reference data record and the second reference data record are substantially duplicates; and
   replacing the first identification in the first field of the first reference data record with the second identification.

5. The method of claim 4 further comprising
   replacing the second identification in the first field of the first reference data record with the first identification.

6. The method of claim 2
   creating a first field for a third reference data record and placing a third identification in the first field of the third reference data record;
   creating a second field for a third reference data record and placing the third identification in the second field of the second reference data record;
   wherein the third identification uniquely identifies the third reference data record;
   determining that the first reference data record should be merged with the second reference data record;
   replacing the first identification in the first field of the first data record with the third identification; and
   replacing the second identification in the first field of the second reference data record with the third identification.

7. The method of claim 6 further comprising replacing the third identification in the first field of the first reference data record with the first identification; and replacing the third identification in the first field of the second reference data record with the second identification.

8. The method of claim 2 further comprising creating a third field for the first reference data record and placing a first status value in the third field of the first reference data record;

creating a third field for the second reference data record and placing a second status value in the third field of the second reference data record;

wherein the first status value is indicative of a first data method which was last performed upon the first reference data record, the first data method having modified a value of a field of the first reference data record; and wherein the second status value is indicative of a second data method which was last performed upon the second reference data record, the second data method having modified a value of a field of the second reference data record.

9. The method of claim 8 further comprising determining that the first reference data record and the second reference data record are substantially duplicates;

determining that the first status value indicates that the first data method last performed on the first reference data record is a data method which permits the first reference data record to be declared a substantial duplicate of the second reference data record;

determining that the second status value indicates that the second data method last performed on the second reference data record is a data method which permits the first reference data record to be declared a substantial duplicate of the second reference data record;

replacing the first identification in the first field of the first reference data record with the second identification;

and changing the first status value in the third field of the first reference data record to indicate that the last data method performed on the first reference data record was a declare substantially duplicate data method.

10. The method of claim 9 and further comprising determining that the first status value indicates that a declare substantially duplicate data method was the last data method performed on the first reference data record;

replacing the second identification in the first field of the first reference data record with the first identification;

and changing the first status value to indicate that the last data method performed on the first reference data record is one which permits the first reference data record to be subsequently declared a substantial duplicate of another data record.

11. The method of claim 8 further comprising creating a first field for a third reference data record and placing a third identification in the first field of the third reference data record;

creating a second field for a third reference data record and placing the third identification in the second field of the second reference data record;

wherein the third identification uniquely identifies the third reference data record;

creating a third field for the third reference data record and placing a third status value in the third field of the first reference data record;

wherein the third status value is indicative of a third data method which was last performed upon the third reference data record; the third data method having modified a value of a field of the third reference data record; and determining that the first reference data record should be merged with the second reference data record;

determining that the first status value in the third field of the first reference data record indicates that the first data method last performed on the first reference data record is a data method which permits the first reference data record to be merged with the second reference data record;

determining that the second status value in the third field of the second reference data record indicates that the second data method last performed on the second reference data record is a data method which permits the second reference data record to be merged with the first reference data record;

determining that the third status value in the third field of the third reference data record indicates that the third data method last performed on the third reference data record is a data method which permits the first reference data record to be merged with the second reference data record;

replacing the first identification in the first field of the first reference data record with the third identification;

replacing the second identification in the first field of the second reference data record with the third identification;

changing the first status value in the third field of the first reference data record to indicate that the last data method performed was a merge; and changing the second status value in the third field of the second reference data record to indicate that the last data method performed was a merge.

12. The method of claim 11 further comprising determining that the first status value indicates that the last data method performed on the first reference data record was a merge;

determining that the second status value indicates that the last data method performed on the second reference data record was a merge;

determining that the third status value indicates that the last data method performed on the third reference data record permits a merging of the first and second reference data records to be reversed;

replacing the third identification in the first field of the first reference data record with the first identification;

replacing the third identification in the first field of the second reference data record with the second identification;

changing the first status value in the third field of the first reference data record to indicate that a merge can be performed; and changing the second status value in the third field of the second reference data record to indicate that a merge can be performed.

13. The method of claim 1 wherein the first identification is an identification number.

14. The method of claim 1 further comprising creating a third field for the first reference data record and placing a status value in the third field of the first reference data record;

wherein the status value is indicative of a data method which was last performed upon the first reference data record, the data method having modified a value of a field of the first reference data record.

15. An apparatus comprising a computer memory in which is stored a first table of data records comprised of a first reference data record comprised of a first field in which is placed a first identification, and a second field in which is placed the first identification;

wherein the first identification uniquely identifies the first reference data record.

16. The apparatus of claim 15 further wherein the first table of data records is comprised of a second reference data record comprised of a first field in which is placed a second identification, and a second field in which is placed the second identification;

wherein the second identification uniquely identifies the second reference data record.

17. The apparatus of claim 16 wherein the first identification is an identification number;

and the second identification is an identification number.

18. The apparatus of claim 15 wherein the first identification is an identification number.

19. The apparatus of claim 15 wherein the first reference data record of the first table of records is further comprised of a third field in which is placed a status value, wherein the status value indicates the last data method performed on the first reference data record, the last data method having modified a value of a field of the first reference data record.

20. The apparatus of claim 19 wherein wherein the status value indicates that the last data method performed was declaring the first reference data record of the first table of records to be a substantial duplicate of another reference data record.

21. The apparatus of claim 19 wherein wherein the status value indicates that the last data method performed was merging the first reference-data record of the first table of records with another reference data record.

22. The apparatus of claim 15 further comprised of a second table of data records stored in the computer memory comprised of a first data record which is comprised of a first field in which is placed the first identification.

23. A computer-implemented method comprised of the steps of:

forming a first table of data records comprised of a first data record and a second data record;

wherein the first data record and the second data record both have first and second fields, each first field having data uniquely identifying the particular data record;

wherein the first field of the first data record and the second field of the first data record have the same data;

wherein the first field of the second data record and the second field of the second data record have the same data;

adding a third data record comprised of first and second fields, the first field of the third data record having data uniquely identifying the third data record and the second field of the third data record having the same data as the first field of the third data record;

and changing the data in the second fields of the first and second data records so that these fields have data which identifies the third data record.

24. The method of claim 23 wherein:

the first, second, and third data records each include a third field which is placed a status value for the corresponding data record, each status value indicative of a data method which was last performed upon the corresponding data record, each data method which was last performed having modified a value of a field of the corresponding data record.

25. The method of claim 24, wherein each status value indicates whether its corresponding data record has been merged.

26. A computer-implemented method comprising the steps of:

taking a table of data records stored in memory;

adding first, second, and third fields to each data record;

storing data in each of the first, second and third fields;

wherein the data in each of the first fields uniquely identifies each corresponding data record;

wherein the data in each of the second fields of each of the data records is the same as the data in the first field of the same data record; and wherein the data in each of the third fields is a status value for the corresponding data record, each status value indicating a data method which was last performed upon the corresponding data record, each data method which was last performed having modified a value of a field of the corresponding data record.

27. The method of claim 26 wherein each status value indicates that the corresponding data record can be declared a duplicate of another data record.

* * * * *